(12) United States Patent
Matsuyama et al.

(10) Patent No.: US 11,329,934 B2
(45) Date of Patent: May 10, 2022

(54) RECORDING MEDIUM, INFORMATION MANAGEMENT METHOD, AND INFORMATION MANAGEMENT APPARATUS

(71) Applicant: FUJITSU LIMITED, Kawasaki (JP)

(72) Inventors: Hiroshi Matsuyama, Ota (JP); Shinji Narukawa, Ohta (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/159,295

(22) Filed: Jan. 27, 2021

(65) Prior Publication Data

US 2021/0152498 A1 May 20, 2021

Related U.S. Application Data

(63) Continuation of application No. PCT/JP2019/022716, filed on Jun. 7, 2019.

(51) Int. Cl.
*H04L 12/58* (2006.01)
*G06F 21/62* (2013.01)
(Continued)

(52) U.S. Cl.
CPC .......... *H04L 51/02* (2013.01); *G06F 21/6245* (2013.01); *G06Q 30/0631* (2013.01)

(58) Field of Classification Search
CPC .. H04L 51/02; G06F 21/6245; G06Q 30/0631
See application file for complete search history.

(56) References Cited

U.S. PATENT DOCUMENTS

2011/0106895 A1* 5/2011 Ventilla ................ H04L 12/66
709/206
2012/0239761 A1* 9/2012 Linner .................. G06F 40/279
709/206
(Continued)

FOREIGN PATENT DOCUMENTS

JP 2016-15162 A 1/2016
JP 2016-136347 A 7/2016
(Continued)

OTHER PUBLICATIONS

International Search Report dated Aug. 27, 2019, issued in counterpart International Application No. PCT/JP2019/022716 (2 pages).
(Continued)

*Primary Examiner* — Richard G Keehn
*Assistant Examiner* — Hassan A Khan
(74) *Attorney, Agent, or Firm* — Westerman, Hattori, Daniels & Adrian, LLP

(57) ABSTRACT

An information management apparatus starts a conversation with a chatbot on an information processing terminal in response to a received chat start instruction, and based on the content of the conversation, sends recommend information related to a service to the information processing terminal. The information management apparatus sends pass information that enables access to user information received from the information processing terminal, the pass information being sent to an information processing device that corresponds to a provider of the service, when information indicating a desire to use the service is received from the information processing terminal in response to the recommend information. The information management apparatus deletes the user information when receiving from the information processing device, acknowledgment indicating that
(Continued)

the service can be provided to the user that corresponds to the user information accessed using the pass information.

11 Claims, 30 Drawing Sheets

(51) Int. Cl.
*G06Q 30/06* (2012.01)
*H04L 51/02* (2022.01)

(56) References Cited

U.S. PATENT DOCUMENTS

| | | | | |
|---|---|---|---|---|
| 2013/0297551 | A1* | 11/2013 | Smith | G06N 5/02 706/48 |
| 2017/0180294 | A1* | 6/2017 | Milligan | H04L 51/16 |
| 2018/0196796 | A1* | 7/2018 | Wu | G06F 40/289 |
| 2018/0329924 | A1 | 11/2018 | Asai | |
| 2018/0367484 | A1* | 12/2018 | Rodriguez | G06Q 10/101 |
| 2019/0187949 | A1 | 6/2019 | Sugimoto et al. | |
| 2019/0363998 | A1* | 11/2019 | Pappu | H04L 12/1813 |

FOREIGN PATENT DOCUMENTS

| | | |
|---|---|---|
| JP | 2018-32200 A | 3/2018 |
| JP | 2018-97564 A | 6/2018 |
| JP | 2018-142019 A | 9/2018 |
| JP | 2019-9610 A | 1/2019 |
| JP | 2019-36197 A | 3/2019 |
| JP | 2019-508820 A | 3/2019 |
| WO | 2018-143440 A1 | 8/2018 |

OTHER PUBLICATIONS

Written Opinion dated Aug. 27, 2019, issued in counterpart International Application No. PCT/JP2019/022716, w/ English partial translation (7 pages).

\* cited by examiner

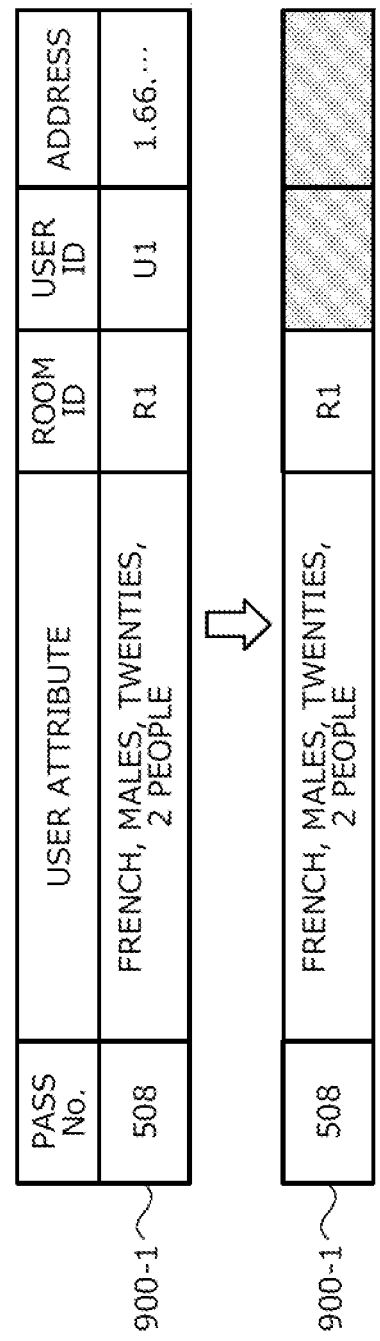

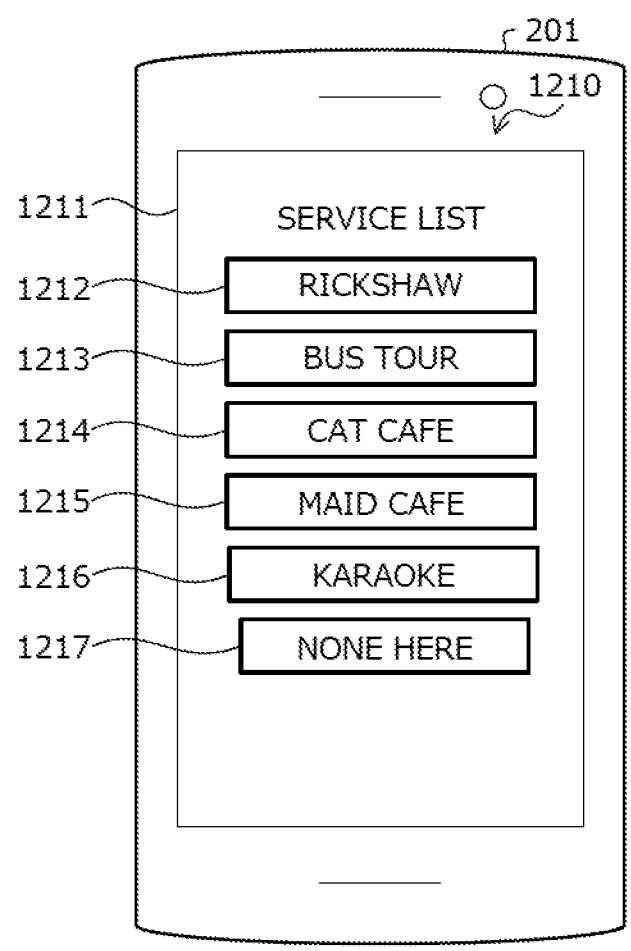
FIG.12A1

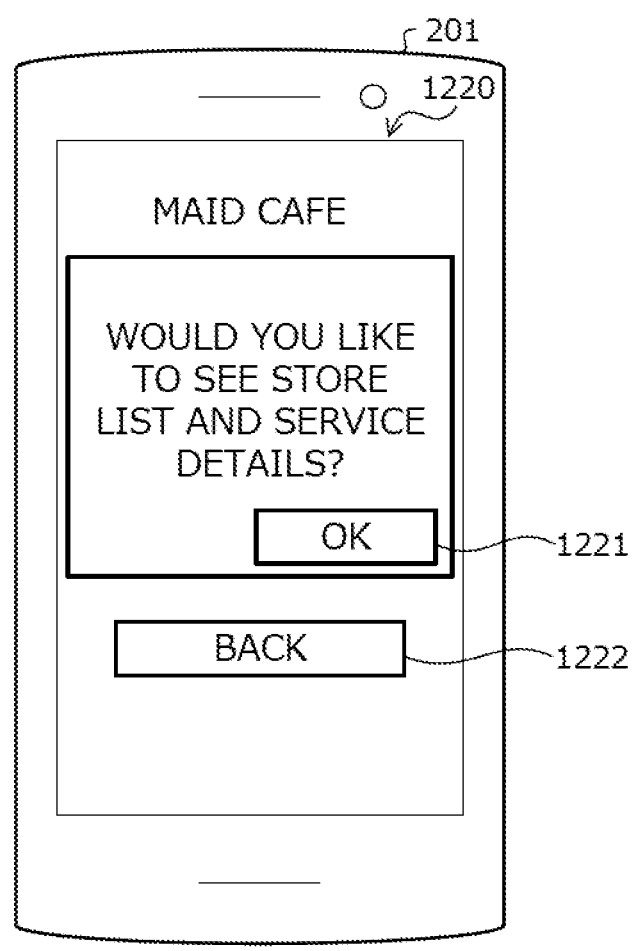
FIG.12A2

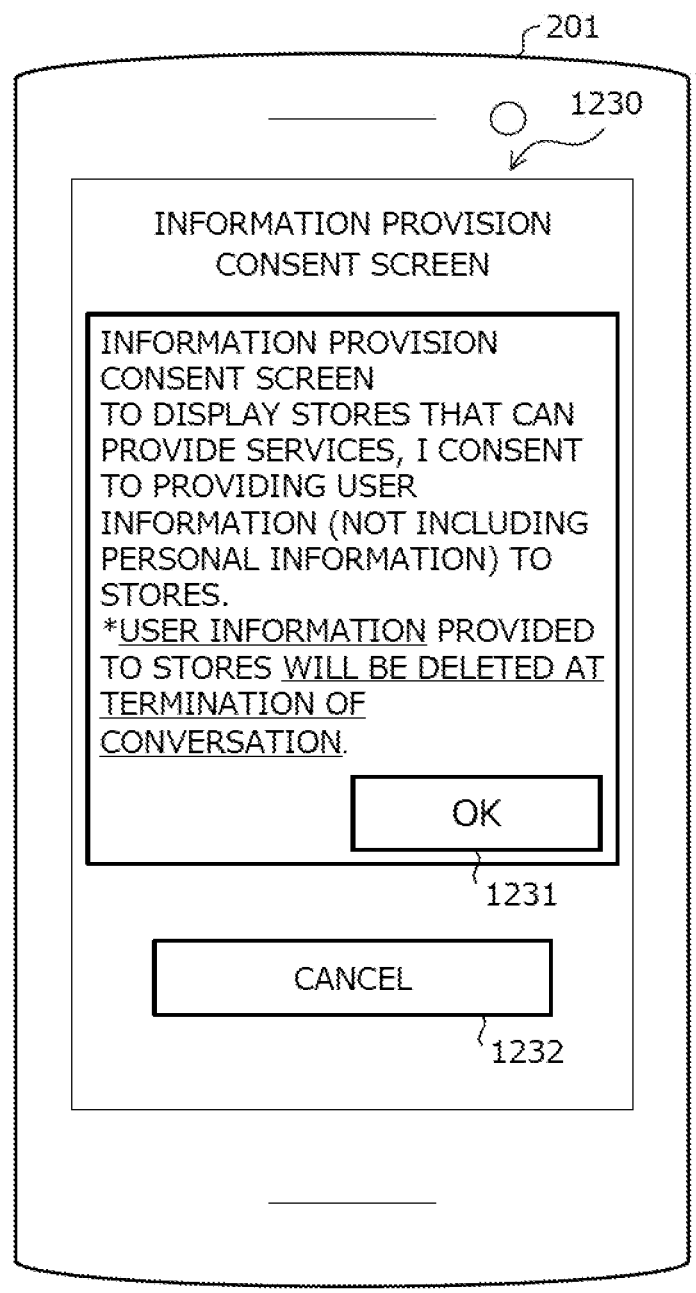
FIG.12B1

FIG.12B2
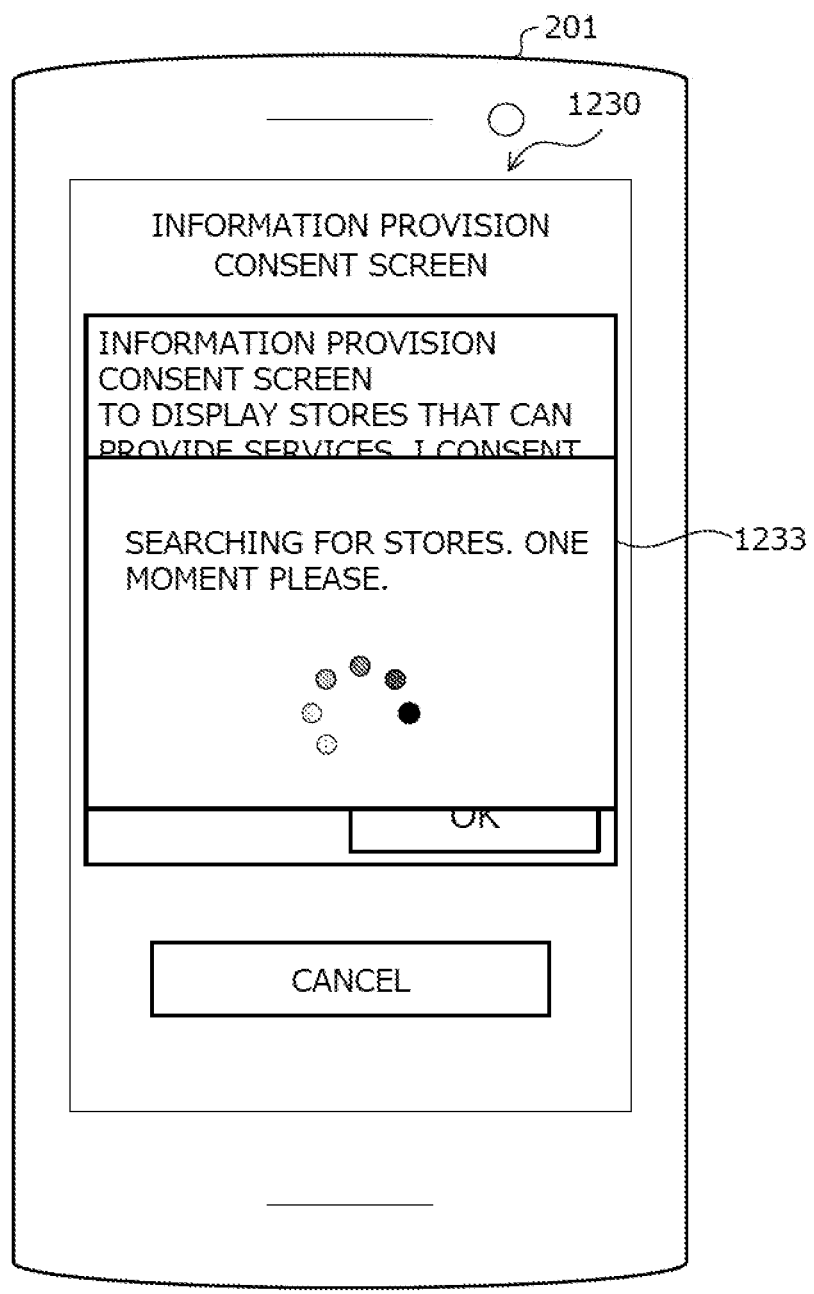

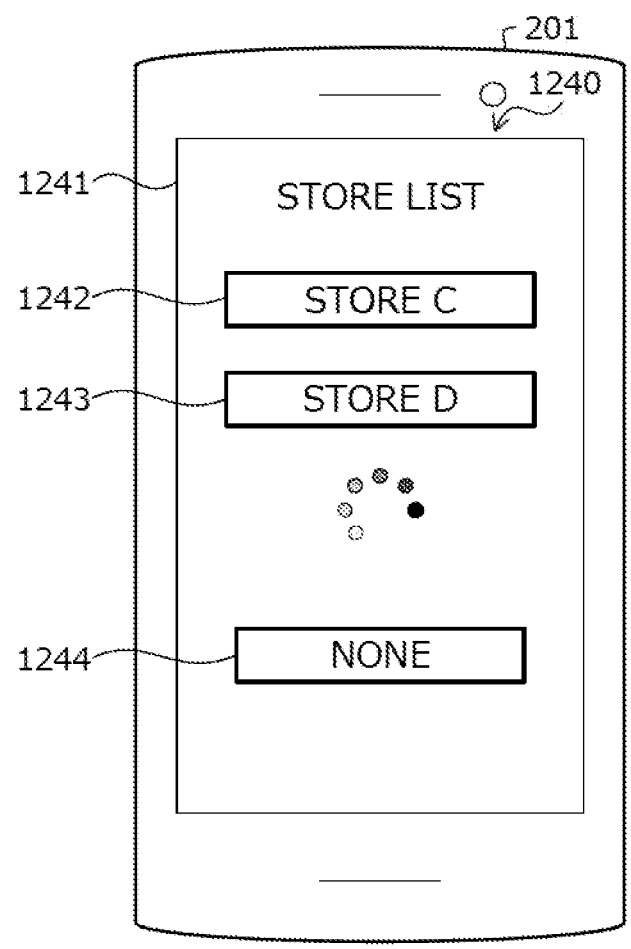
FIG.12C1

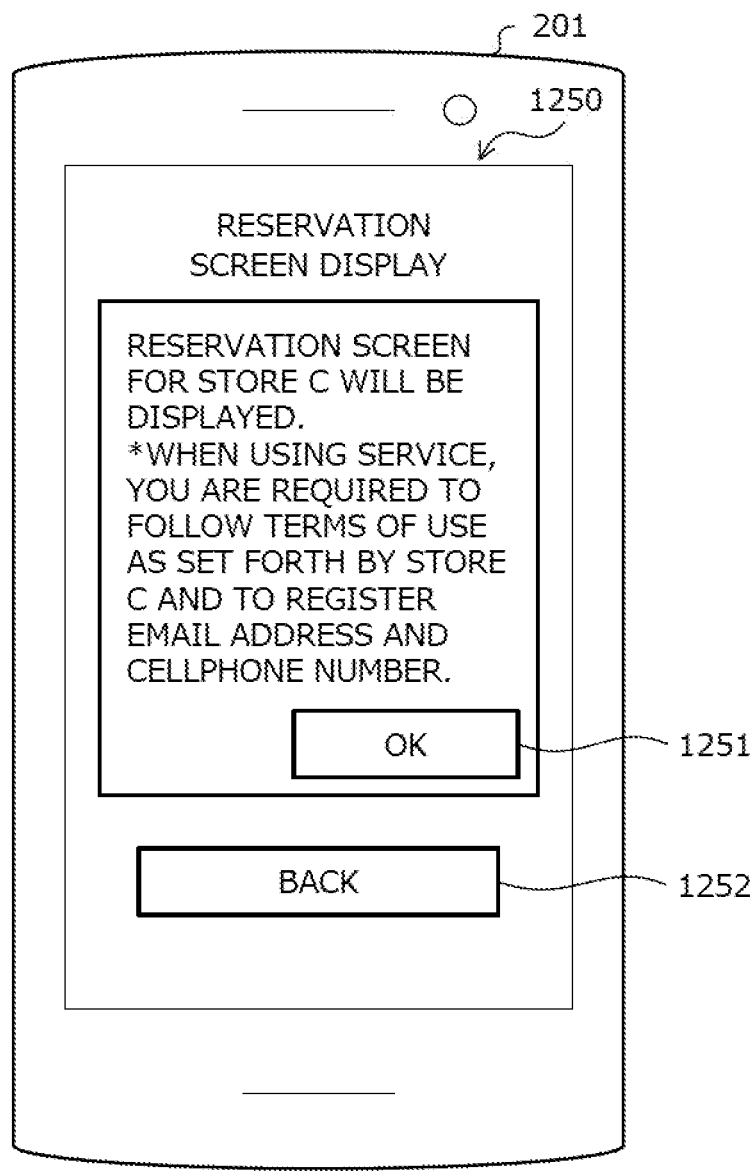
FIG.12C2

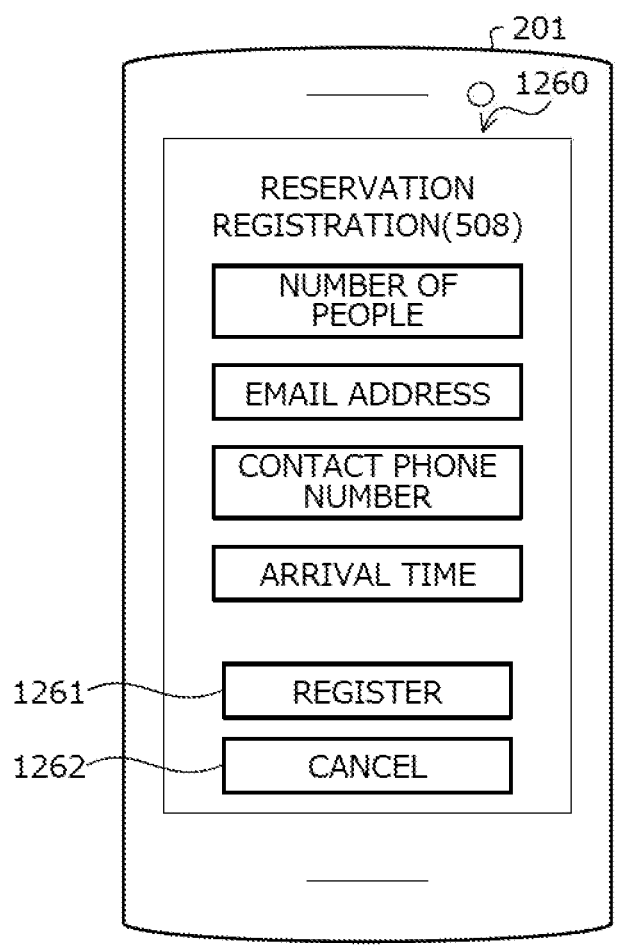
FIG.12D1

FIG.12D2
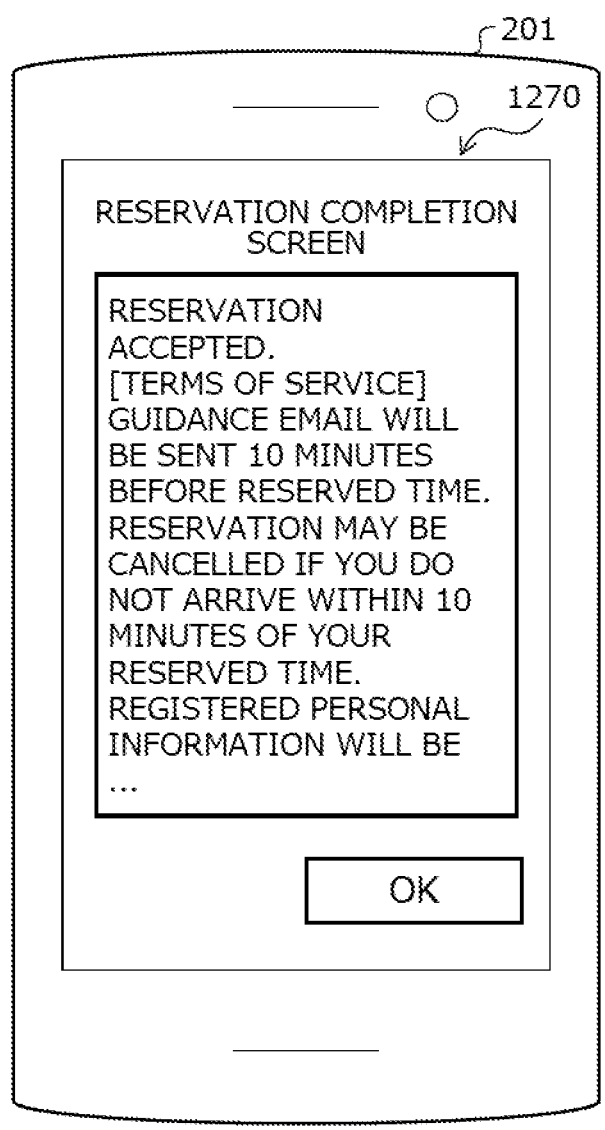

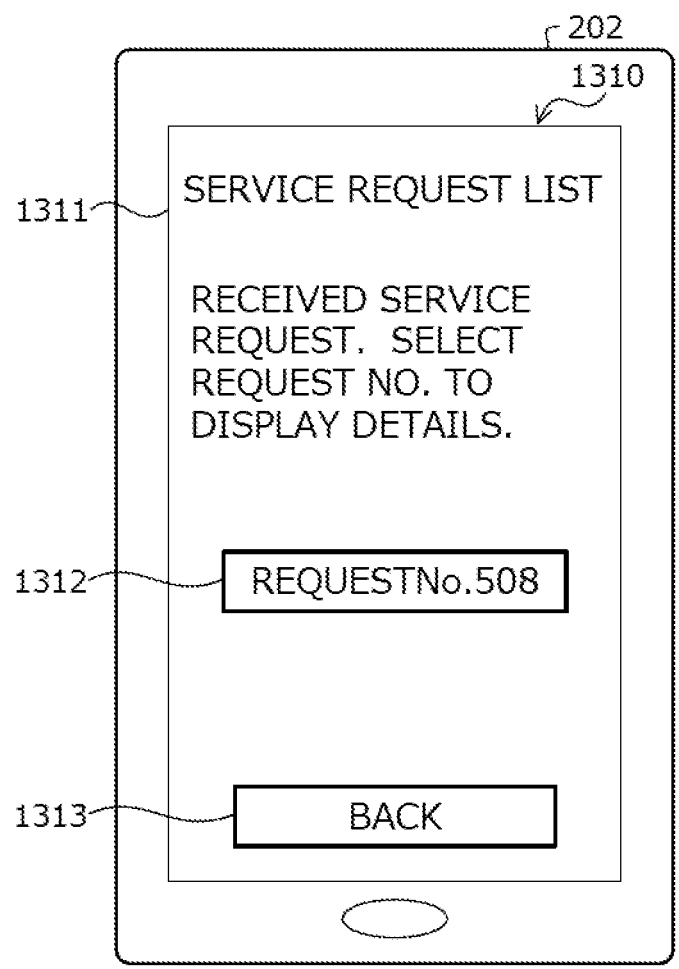
FIG.13A1

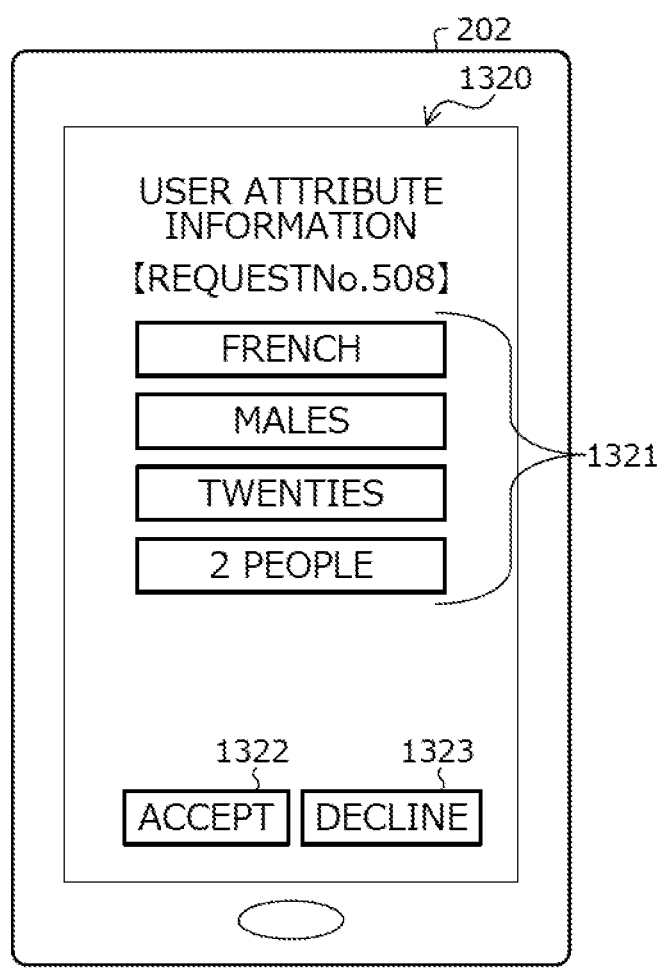
FIG.13A2

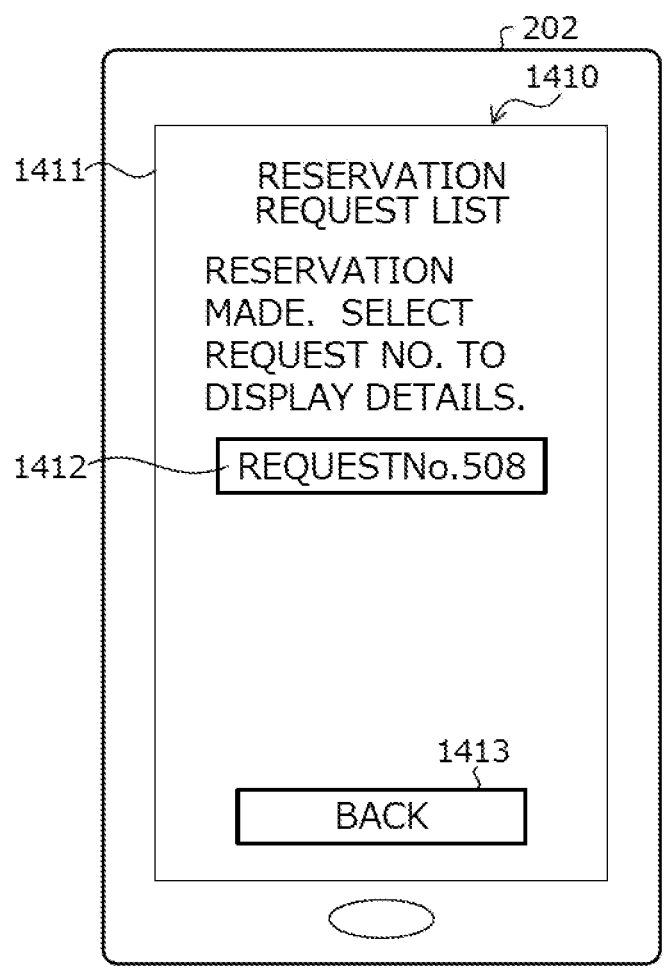
FIG.14A1

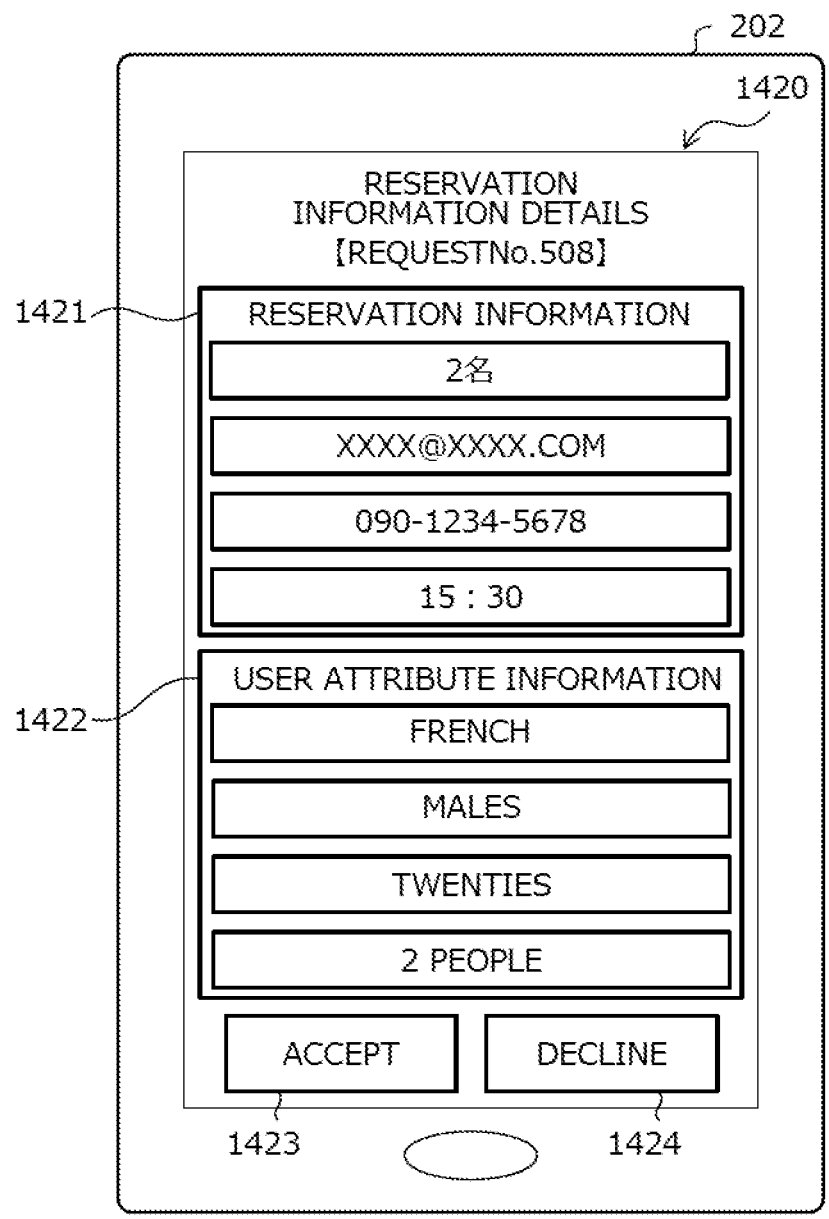
FIG.14A2

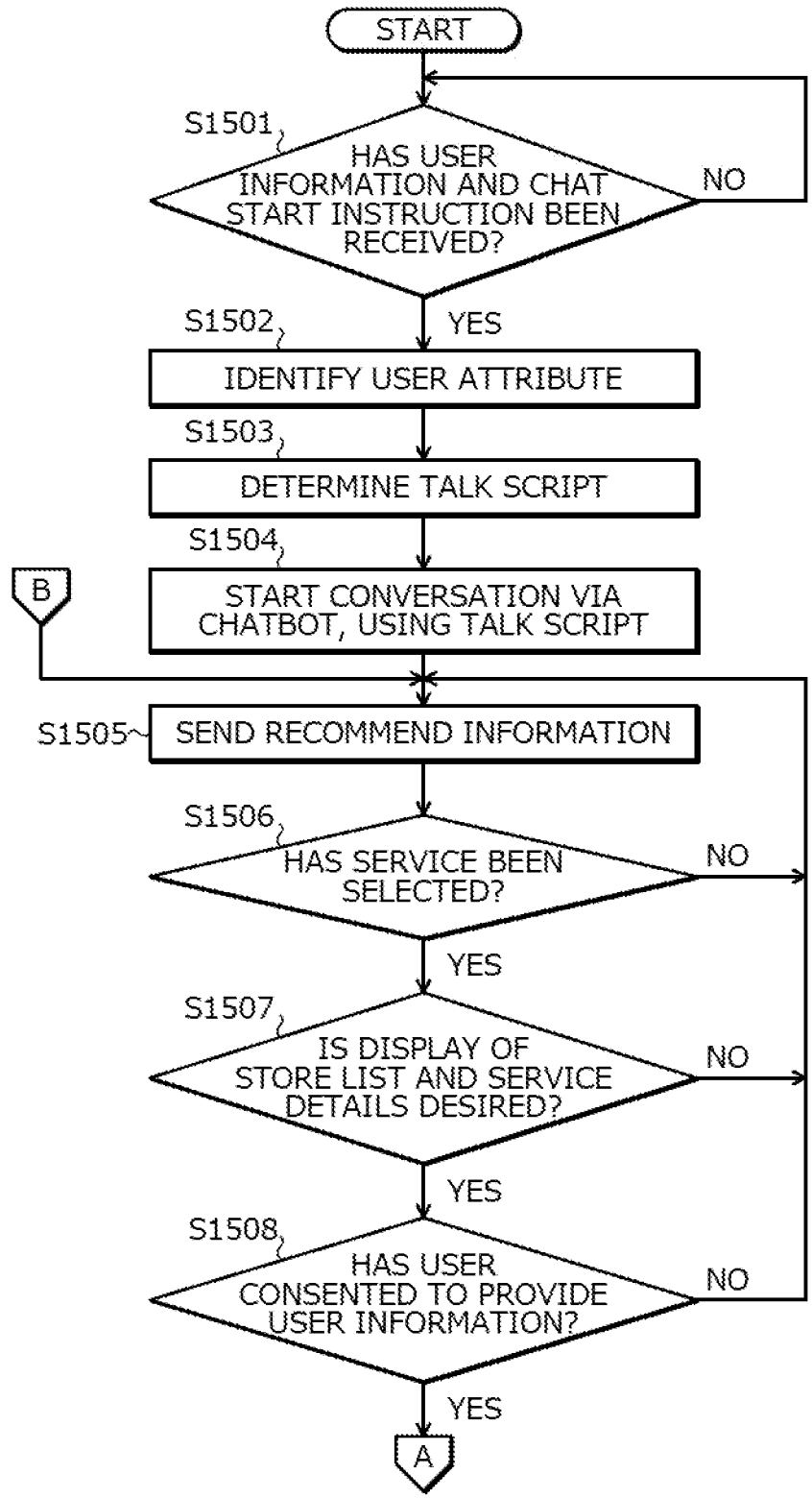

RECORDING MEDIUM, INFORMATION MANAGEMENT METHOD, AND INFORMATION MANAGEMENT APPARATUS

CROSS REFERENCE TO RELATED APPLICATIONS

This application is a continuation application of International Application PCT/JP2019/022716, filed on Jun. 7, 2019 and designating the U.S., the entire contents of which are incorporated herein by reference.

FIELD

The embodiments discussed herein relate to a recording medium, an information management method, and an information management apparatus.

BACKGROUND

In recent years, there is a service that provides information such as store information or tourist information by utilizing a chatbot. The chatbot is a computer system that interacts with humans and exchanges messages by use of artificial intelligence.

An example of prior art is one that specifies an available entity from a message exchange thread, determines a context indicator of the entity, determines whether the entity is available based on the context indicator, and provides participants with a suggestion about the entity in response to the entity being available. For an example, refer to Published Japanese-Translation of PCT Application, Publication No. 2019-508820.

SUMMARY

According to an aspect of an embodiment, a non-transitory, computer-readable recording medium stores therein an information management program for causing a computer to execute a process including: receiving a chat start instruction from an information processing terminal and receiving therefrom user information that includes attribute information of a user and personal information of a user obtained by the information processing terminal; starting a conversation with a chatbot on the information processing terminal in response to the chat start instruction, and sending recommend information related to a service to the information processing terminal, based on contents of the conversation; sending pass information that enables access to the attribute information of the user included in the user information received, the pass information being sent to an information processing device that corresponds to a provider of the service, when information indicating a desire to use the service is received from the information processing terminal as a reply to the recommend information; and deleting the user information at least when a predetermined time elapses or when information indicating that the service is providable to the user that corresponds to the user information accessed using the pass information is received from the information processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is an explanatory view depicting a user information deletion example.

FIG. 12A1 is an explanatory view depicting a screen example of a conversation screen of the user terminal 201.

FIG. 12A2 is an explanatory view depicting a screen example of a conversation screen of the user terminal 201.

FIG. 12B1 is an explanatory view depicting a screen example of a conversation screen of the user terminal 201.

FIG. 12B2 is an explanatory view depicting a screen example of a conversation screen of the user terminal 201.

FIG. 12C1 is an explanatory view depicting a screen example of a conversation screen of the user terminal 201.

FIG. 12C2 is an explanatory view depicting a screen example of a conversation screen of the user terminal 201.

FIG. 12D1 is an explanatory view depicting a screen example of a conversation screen of the user terminal 201.

FIG. 12D2 is an explanatory view depicting a screen example of a conversation screen of the user terminal 201.

FIG. 13A1 is an explanatory view depicting a screen example of a user attribute screen of a client terminal 202.

FIG. 13A2 is an explanatory view depicting a screen example of a user attribute screen of the client terminal 202.

FIG. 14A1 an explanatory view depicting a screen example of a reservation confirmation screen of the client terminal 202.

FIG. 14A2 is an explanatory view depicting a screen example of a reservation confirmation screen of the client terminal 202.

FIG. 15 is a flowchart depicting an example of an information management processing procedure of the information management apparatus 101.

DESCRIPTION OF THE INVENTION

In a case of providing temporary services, etc. by utilizing the chatbot, however, it is hard to provide services tailored to individual users.

Embodiments of a recording medium, an information management method, and an information management apparatus are described in detail with reference to the accompanying drawings.

Figure 1:
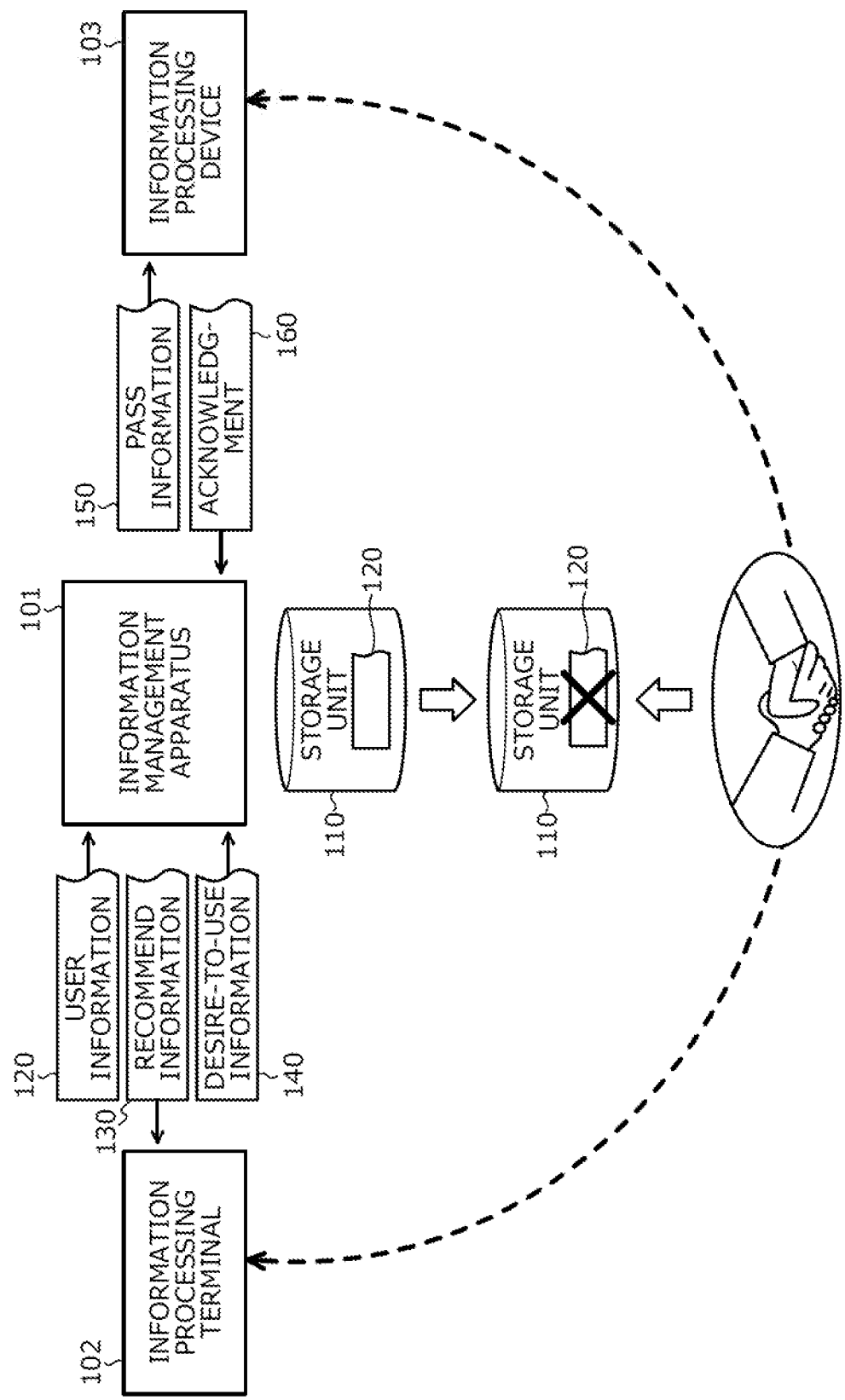
FIG. 1 is an explanatory view depicting an example of an information management method according to an embodiment.

FIG. 1 is an explanatory view depicting an example of an information management method according to an embodiment. In FIG. 1, an information management apparatus 101 is a computer that supports the provision of services that utilize chatbots. An example of such services is a service of providing information such as store information or tourist information.

An information processing terminal 102 is a computer utilized when a user has a conversation with a chatbot. An information processing device 103 is a computer used by a service provider. The information processing terminal 102 and the information processing device 103 may be for example a smartphone, a tablet personal computer (PC), etc.

In a case of providing information such as store information or tourist information by utilizing the chatbot, it is desirable to provide services tailored to individual users. For example, the services suiting the users may differ depending on differences in age, gender, language, etc. For this reason, it is conceivable that personal information of a user is obtained to provide a service adapted to the user based on the personal information.

However, users are reluctant to offer personal information for temporary services, etc., whereby a problems arises in that use the services is difficult. For example, users are reluctant to permit personal information to be collected and accumulated as a log for services used in tourist areas, thus, as a result, a user may give up using the services.

Thus, in this embodiment, the information management method is described in which user information obtained to provide a service suited to a user is deleted, for example, when matching between the user and the service provider is established, whereupon personal information cannot be collected so that user resistance decreases, thereby achieving smooth provision of the service utilizing the chatbot. A processing example of the information management apparatus 101 is described below.

(1) The information management apparatus 101 receives a chat start instruction from the information processing terminal 102 and receives user information corresponding to the information processing terminal 102. The chat start instruction is for starting a conversation between the user and the chatbot.

The user information is information related to the user using the information processing terminal 102 and includes user attribute information and user personal information, for example. The user attribute information is information representing characteristics and a situation of the user and, for example, is information representative of age, gender, nationality, language, location, etc. The user personal information is information that identifies the user and is a user ID, for example.

The example depicted in FIG. 1 assumes a case where user information 120 together with the chat start instruction are received from the information processing terminal 102. For example, the received user information 120 is stored to a storage unit 110 and is managed in association with a chatlog. The chatlog is information that identifies the content of a conversation between the chatbot and the user.

(2) In response to the chat start instruction, the information management apparatus 101 starts a chatbot conversation on the information processing terminal 102 and, based on the content of the conversation, sends recommend information on services to the information processing terminal 102. The recommend information is information related services recommended to the user and is, for example, a list of recommended services. The content of the conversation includes, for example, a choice selected by the user and a message input by the user.

For example, in a case in which a choice requiring display of the service list is selected after a chatbot conversation starts, the information management apparatus 101 sends recommend information 130 related to services to the information processing terminal 102. As a result, a recommended service list is displayed on the information processing terminal 102.

When providing services that utilize chatbots, the information management apparatus 101 may output to the information processing terminal 102, information indicating that user information received from the information processing terminal 102 at the time of termination of the conversation with the chatbot will be deleted. Information indicating deletion of the user information is, for example, a message such as "Information obtained to provide services tailored to customers is deleted upon termination of conversation".

The timing at which the message is output may be set arbitrarily. For example, the information management apparatus 101 may output the message to the information processing terminal 102 at the time of the start or termination of the conversation with the chatbot. The information management apparatus 101 may additionally output the message when sending recommend information on services to the information processing terminal 102.

The example depicted in FIG. 1 assumes a case where the recommend information 130 on services is sent to the information processing terminal 102 after the chatbot conversation starts. The recommend information 130 is a list of recommended services. A case is assumed in which the message that user information obtained from the information processing terminal 102 will be deleted upon termination of conversation has been output to the information processing terminal 102.

(3) When the information management apparatus 101 receives, from the information processing terminal 102, information related to a desire to use a service as a reply to the recommend information, the information management apparatus 101 sends, to the information processing device 103 that corresponds to the service provider, pass information 150 that enables access to the received user information. The information related to a desire to use a service is information indicating that the user desires to use a service. The information related to a desire to use a service includes, for example, a request to display a list of service providers.

The pass information indicates authority to access the user information. For example, the pass information is information that enables access to the user information a predetermined number of times within a validity period. The pass information may be, for example, information that enables access to only the user attribute information, of the user attribute information and personal information included in the user information.

For example, with respect to a service that the user desires to use, the information management apparatus 101 sends pass information to the information processing device 103 that corresponds to a previously registered provider of the service. Based on the pass information, the information processing device 103 is able to access the user information. As a result, the provider of the service checks user attribute information, etc. of the user who desires to use the service and thereby, is able to determine whether the service can be provided.

The example depicted in FIG. 1 assumes a case where desire-to-use information 140 is received as a reply to the recommend information 130 from the information processing terminal 102. The desire-to-use information 140 is information related to a desire to use a service A. In this case, the pass information 150 that enables access to the user information 120 is sent to the information processing device 103 that corresponds to the provider of the service A. When the information management apparatus 101 receives an access request based on the pass information 150 from the information processing device 103, the information management apparatus 101 sends, to the information processing device 103, the user information 120 that corresponds to the pass information 150 stored in the storage unit 110.

(4) The information management apparatus 101 deletes the user information at least in a case of receiving information indicating that the service can be provided to the user corresponding to the user information accessed by the information processing device 103 using the pass information or in a case in which a predetermined time elapses. The predetermined time may be arbitrarily set and is set to, for example, a time of several tens of seconds.

For example, the information management apparatus 101 deletes the user information in a case in which information indicating that the service can be provided is received from any information processing device 103 corresponding to the provider of the service. In other words, user information is deleted at a timing when a provider is found who can provide a service to a user desiring to use the service. The information management apparatus 101 may delete the user information in a case in which a predetermined time elapses from sending the pass information to the information processing device 103.

The example depicted in FIG. 1 assumes a case in which an acknowledgment 160 is received from the information processing device 103. The acknowledgment 160 is information indicating that the service A can be provided to the user that corresponds to the user information 120 accessed using the pass information 150. In this case, the information management apparatus 101 deletes the user information 120 that corresponds to the pass information 150, stored in the storage unit 110.

There may be a case in which communication with the information processing terminal 102 is disconnected before the information management apparatus 101 receives, from the information processing device 103, information indicating that the service can be provided. For example, communication with the information processing terminal 102 is disconnected when the user forcibly terminates a conversation with the chatbot or when a communication failure occurs. In this case, in the information management apparatus 101, user information received from the information processing terminal 102 remains without being deleted. For this reason, the information management apparatus 101 may delete the user information in a case in which communication with the information processing terminal 102 is terminated.

In this manner, according to the information management apparatus 101, information of a user who desires to use a service may be accessed by the provider of the service. This enables the service provider to determine whether the service can be provided after checking the attribute information, etc. of the user who desires to use the service, thereby leading to the provision of services tailored to individual users.

The user information is deleted from the information management apparatus 101 at the timing when a provider is found that can provide a service to a user desiring to use the service or at the timing when a predetermined time elapses, whereby the user information may be prevented from being accumulated as a log. This reduces user resistance to personal information being taken, achieving smooth provision of the service utilizing the chatbot.

In the example depicted in FIG. 1, the provider of the service A may determine whether the service A can be provided, after checking the attribute information, etc. of the user who desires to use the service A. The user information 120 may be deleted from the storage unit 110 at the timing when a provider capable of providing the service A is matched to the user desiring to use the service A. This may prevent the user information 120 from being accumulated as a log, so that the user is able to use the service A with peace of mind.

A system configuration example of an information management system 200 including the information management apparatus 101 depicted in FIG. 1 is described next.

Figure 2:
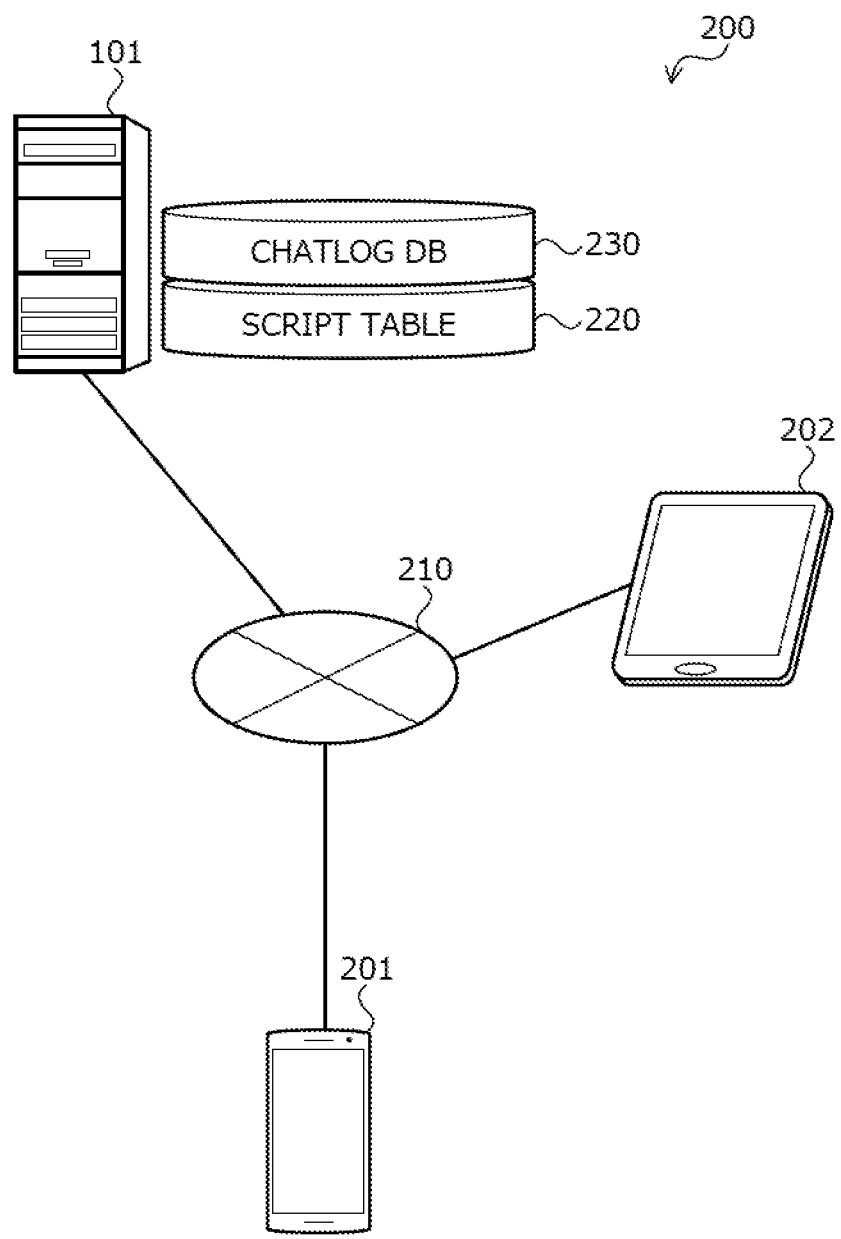
FIG. 2 is an explanatory view depicting a system configuration example of an information management system 200.

FIG. 2 is an explanatory view depicting the system configuration example of the information management system 200. In FIG. 2, the information management system 200 includes the information management apparatus 101, a user terminal 201, and a client terminal 202. In the information management system 200, the information management apparatus 101, the user terminal 201, and the client terminal 202 are connected to one another via a wired or wireless network 210. The network 210 is, for example, a local area network (LAN), a wide area network (WAN), or Internet.

The information management apparatus 101 has a script table 220 and a chatlog database (DB) 230 and controls the conversation of a chatbot. For example, the information management apparatus 101 is a server. The storage content of the script table 220 and the chatlog DB 230 will be described later using FIGS. 5 and 7.

The user terminal 201 is a computer used when a user has a conversation with the chatbot. For example, the user terminal 201 is a smartphone, a tablet PC, etc. The user terminal 201 may be an information processing terminal such as a digital board installed in a public place. The information processing terminal 102 depicted in FIG. 1 corresponds to, for example, the user terminal 201.

The client terminal 202 is a computer that a service provider uses. For example, the client terminal 202 is a smartphone, a tablet PC, etc. The information processing device 103 depicted in FIG. 1 corresponds to, for example, the client terminal 202.

Although a single user terminal 201 and a single client terminal 202 are depicted in the example depicted in FIG. 2, the information management system 200 includes plural user terminals 201 and plural client terminals 202.

An example of hardware configuration of the information management apparatus 101 is described.

Figure 3:
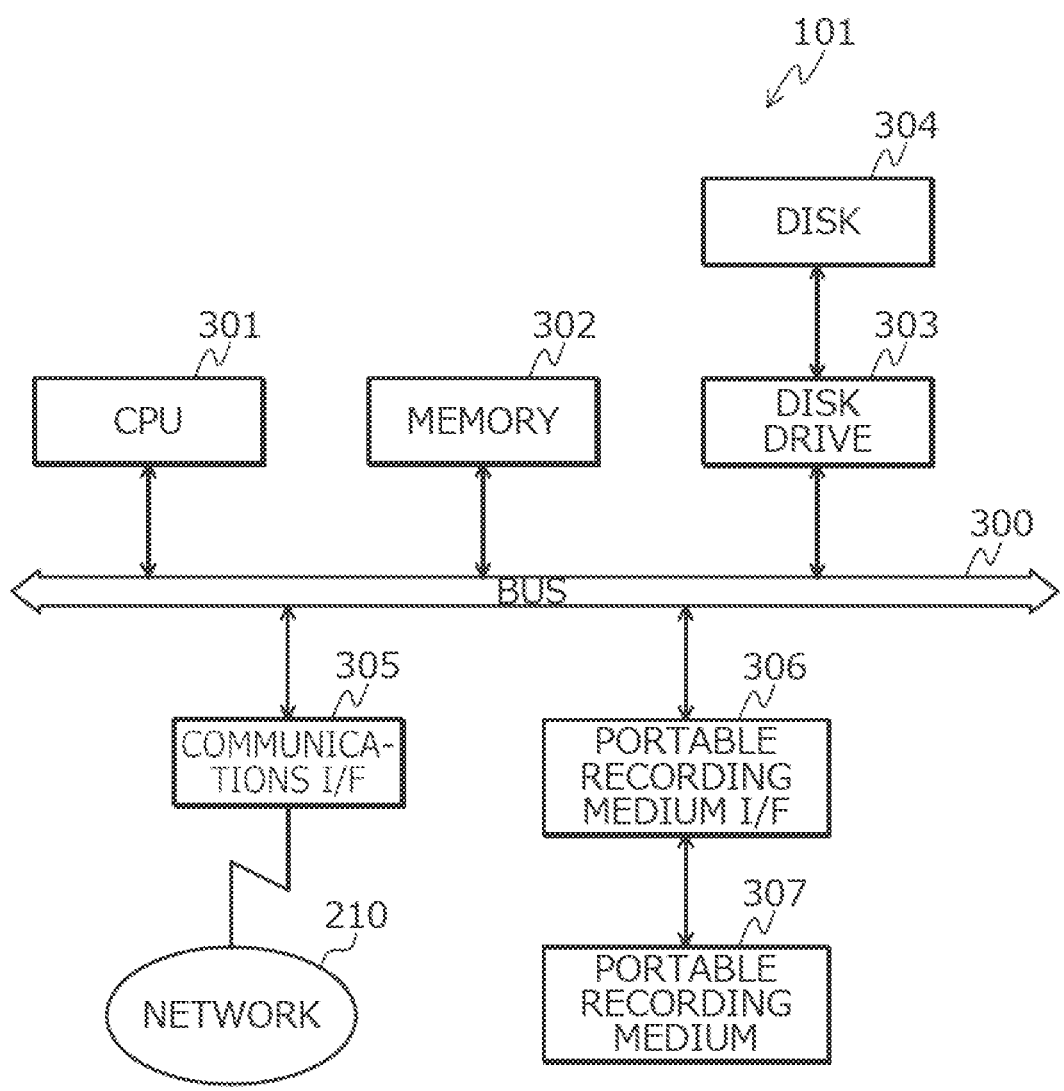
FIG. 3 is a block diagram of an example of a hardware configuration of an information management apparatus 101.

FIG. 3 is a block diagram of an example of a hardware configuration of the information management apparatus 101. In FIG. 3, the information management apparatus 101 has a central management unit (CPU) 301, a memory 302, a disk drive 303, a disk 304, a communications interface (I/F) 305, a portable recording medium I/F 306, and a portable recording medium 307. Further, these components are connected to one another by a bus 300.

Here, the CPU 301 governs overall control of the information management apparatus 101. The CPU 301 may have multiple cores. The memory 302, for example, includes a read only memory (ROM), a random access memory (RAM), and a flash ROM, etc. In particular, for example, the flash ROM stores therein programs such as an operating system (OS), the ROM stores therein application programs, and the RAM is used as a work area of the CPU 301. Programs stored in the memory 302 are loaded onto the CPU 301, whereby encoded processes are executed by the CPU 301.

The disk drive 303, under the control of the CPU 301, controls the reading and writing of data with respect to the disk 304. The disk 304 stores therein data written thereto under the control of the disk drive 303. The disk 304, for example, may be a magnetic disk, an optical disk, etc.

The communications I/F 305 is connected to the network 210 through a communications line and is connected to an external computer (for example, the user terminal 201 and the client terminal 202 depicted in FIG. 2) through the network 210. Further, the communications I/F 305 administers an internal interface with the network 210 and controls the input and output of data from an external computer. As the communications I/F 305, for example, a modem, a LAN adapter, etc. may be adopted.

The portable recording medium I/F 306, under the control of the CPU 301, controls the reading and writing of data with respect to the portable recording medium 307. The portable recording medium 307 stores therein data written thereto under the control of the portable recording medium I/F 306. The portable recording medium 307, for example, is a compact disc (CD)-ROM, a digital versatile disk (DVD), a universal serial bus (USB) memory, etc.

The information management apparatus 101, for example, may have a solid state drive (SSD), an input device, a display, etc. In addition to the components described above. Further, of the components described above, the information management apparatus 101, for example, may omit the disk drive 303, the disk 304, the portable recording medium I/F 306, and/or the portable recording medium 307.

An example of a hardware configuration of the user terminal 201 and the client terminal 202 is described. Herein, the user terminal 201 and the client terminal 202 are indicated as "the user terminal 201, etc."

Figure 4:
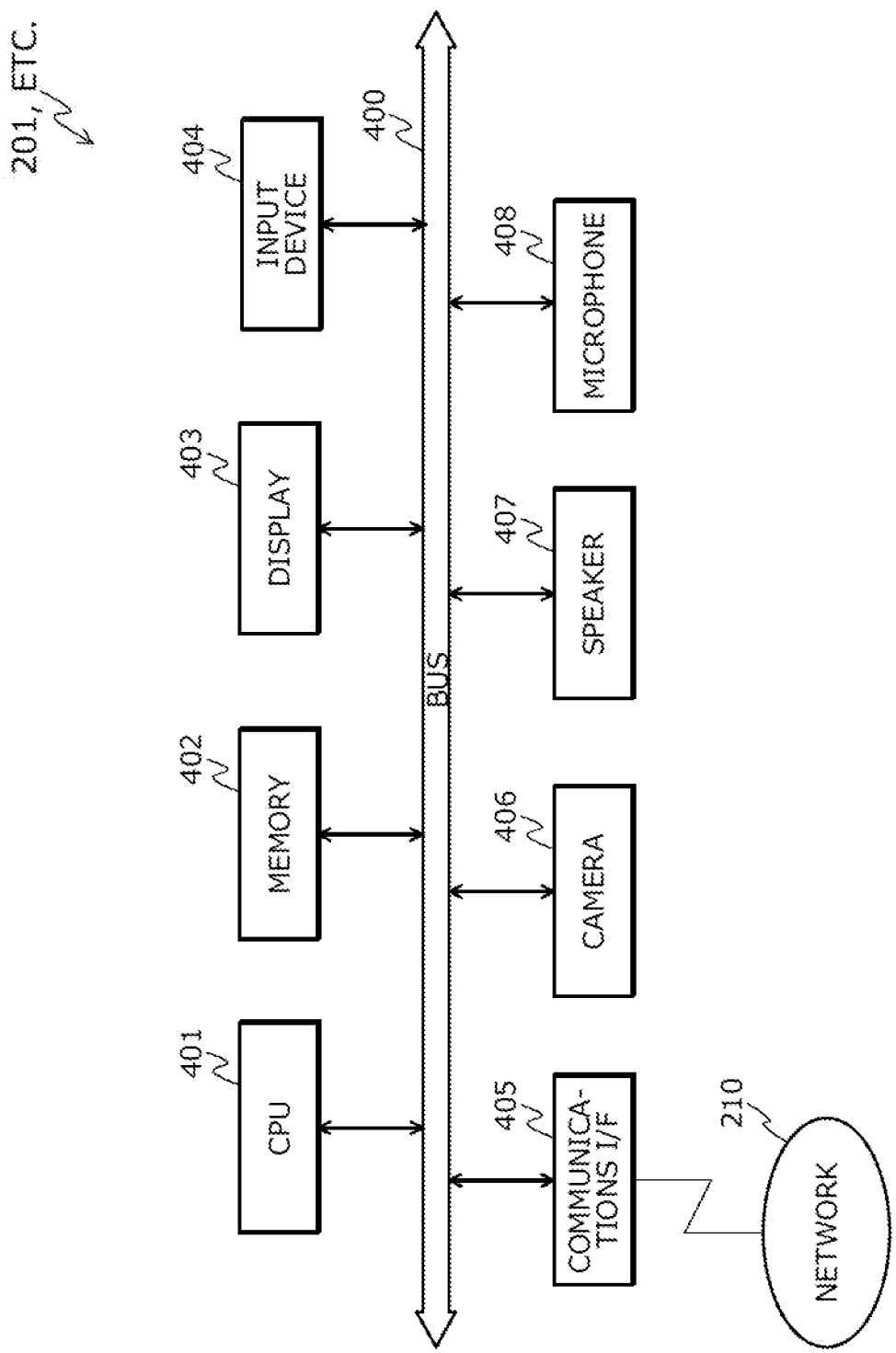
FIG. 4 is a block diagram of an example of a hardware configuration of a user terminal 201, etc.

FIG. 4 is a block diagram of an example of a hardware configuration of the user terminal 201, etc. In FIG. 4, the user terminal 201, etc. each has a CPU 401, a memory 402, a display 403, an input device 404, a communications I/F 405, a camera 406, a speaker 407, and a microphone 408. Further, these components are connected to one another by a bus 400.

Here, the CPU 401 governs overall control of the user terminal 201, etc. The CPU 401 may have multiple cores. The memory 402, for example, is a storage having a ROM, a RAM, and a flash ROM. In particular, for example, the flash ROM and the ROM store therein various types of programs and the RAM is used as a work area of the CPU 401. Programs stored in the memory 402 are loaded onto the CPU 401, whereby encoded processes are executed by the CPU 401.

The display 403 is a display apparatus that displays a cursor, icons, or a toolbox in addition to documents, images, functional information, etc. As the display 403, for example, a liquid crystal display, an organic electroluminescence (EL) display, etc. may be adopted.

The input device 404 has keys for inputting text, numerals, various types of instructions, etc., and inputs data. The input device 404 may be a touch panel type input pad, a numeric keypad, a keyboard, a mouse, etc.

The communications I/F 405 is connected to the network 210 through a communications line and is connected to an external computer (for example, the information management apparatus 101) through the network 210. Further, the communications I/F 405 administers an internal interface with the network 210 and controls the input and output of data from an external apparatus.

The camera 406 is a photographing apparatus that captures images (still pictures or video) and outputs image data. The camera 406, for example, is provided at a position enabling photographing of a person looking at the display 403, a companion thereof, etc. The speaker 407 converts an electrical signal into sound and outputs the sound. The microphone 408 receives sounds and converts the sounds into an electrical signal.

The user terminal 201, etc. may have, for example, a hard disk drive (HDD), a SSD, a near field communications I/F, a portable recording medium I/F, a Global Positioning System (GPS) unit, etc. in addition to the components described above.

Stored contents of the script table 220 of the information management apparatus 101 are described. The script table 220, for example, is realized by a storage apparatus such as the memory 302, the disk 304 depicted in FIG. 3.

Figure 5:
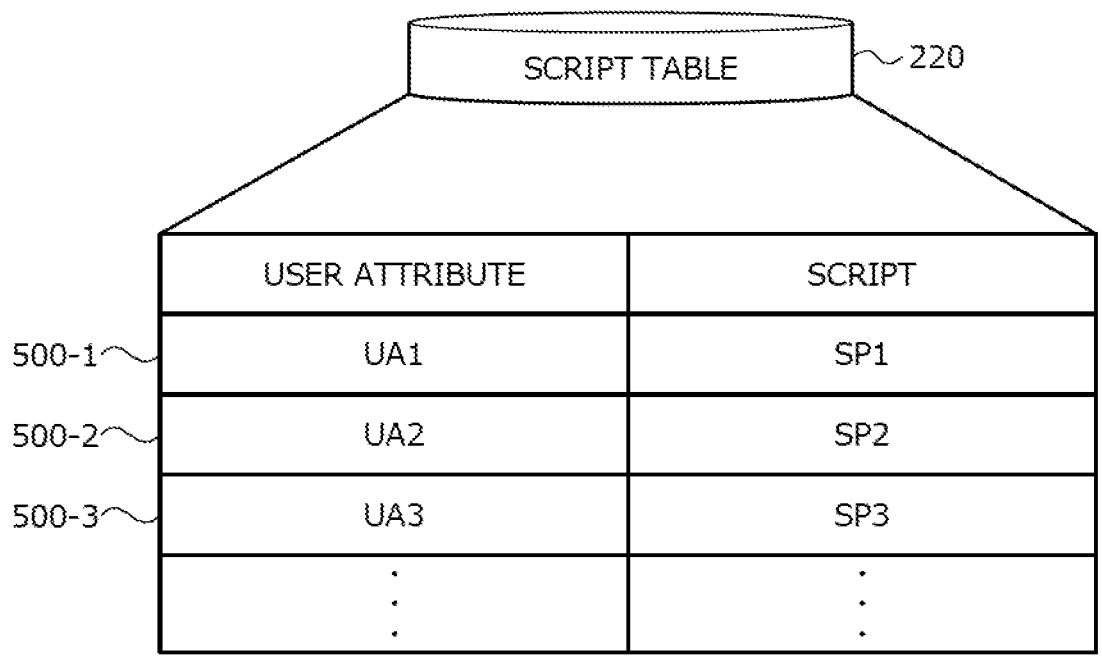
FIG. 5 is a diagram of an example of stored contents of a script table 220.

FIG. 5 is a diagram of an example of stored contents of the script table 220. In FIG. 5, the script table 220 has fields for user attributes and scripts, and by setting information into the fields, script management information (for example, script management information 500-1 to 500-3) is stored as records.

Here, user attributes represent characteristics of users and, for example, are classifications that are combinations of age, gender, language, nationality, location information, meteorological information, etc. User attributes may be, for example, "twenties×female", "thirties×male", "twenties×female×language (English)", "twenties×female×couple", "twenties×female×weather (rain)", "twenties×male×location (Akihabara)", etc. User attributes, for example, may be set as "ALL" to target all users.

A script is information (scenario) defining the flow of the conversation performed by the chatbot and is prepared associated with the user attributes. However, in FIG. 5, only script IDs (for example, SP1, SP2, SP3, . . . ) identifying the scripts are depicted. For example, the script management information 500-1 indicates that a script SP1 corresponds to a user attribute UA1.

A specific example of a script defining a flow of a conversation performed by the chatbot is described. Here, the script SP1 that corresponds to the user attribute UA1 is described as an example.

Figure 6:
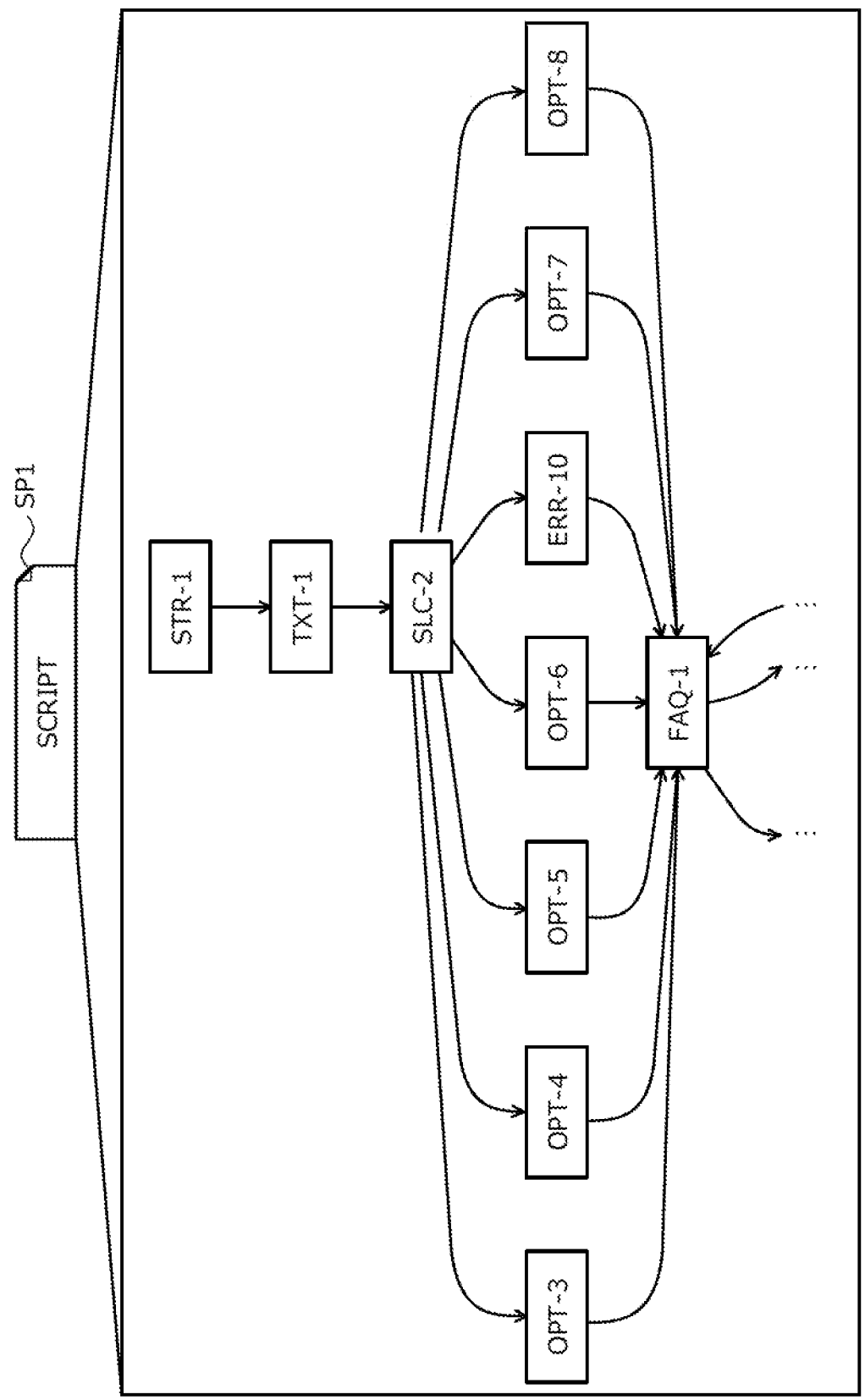
FIG. 6 is a diagram of a specific example of a script.

FIG. 6 is a diagram of a specific example of a script. In FIG. 6, the script SP1 is information (a scenario) defining a flow of a conversation performed by the chatbot. However, in FIG. 6, a portion of the script SP1 is excerpted and displayed. In particular, for example, the script SP1 is information defining a flow of the talk process of a chat.

The talk process is a process for realizing operation (behavior) of the chatbot. For example, the talk process includes the process of speaking, the process of displaying options, the process of selecting an option according to user operation, the process of performing procedures according to the selected option, the process of ending the talk process, etc.

In the script SP1, for example, STR-1 indicates the start of the talk process. TXT-1 indicates the process of speaking a message "Hello. I'm a chatbot. What is your question?". SLC-2 indicates the process of displaying options OPT-3 to OPT-8. For example, OPT-3 indicates an option "Regarding rickshaw". FAQ-1 is a process of searching for and displaying FAQs corresponding to an option. ERR-10 indicates an error process.

The storage content of the chatlog DB 230 included in the information management apparatus 101 is be described. The chatlog DB 230 is implemented by, for example, a storage device such as the memory 302 and the disk 304 depicted in FIG. 3. The storage unit depicted in FIG. 1 corresponds to, for example, the chatlog DB 230.

Figure 7:
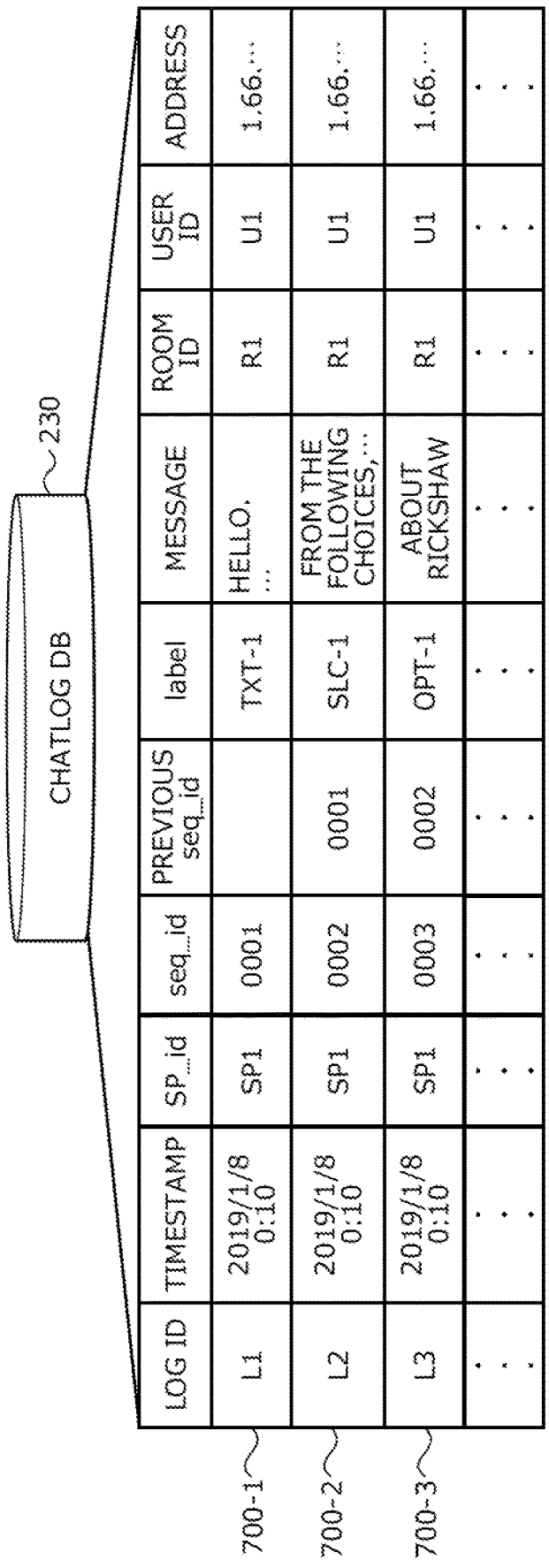
FIG. 7 is an explanatory view depicting an example of storage content of a chatlog DB 230.

FIG. 7 is an explanatory view depicting an example of the storage content of the chatlog DB 230. In FIG. 7, the chatlog DB 230 has fields including Log ID, Timestamp, SP_id, seq_id, Previous seq_id. Label, Message, Room ID, User ID, and Address. By setting information in the fields, chatlogs (e.g., chatlogs 700-1 to 700-3) are stored as records.

Log ID is an identifier that identifies a chatlog. Timestamp denotes date and time at which a process (step) in a script was executed. SP_id is a script ID of a script applied to the conversation of the chatbot. seq_id denotes an ID of an executed process. Previous seq_id denotes an ID of a most recently executed process. Label denotes a name of the executed process.

Message denotes a sentence(s) uttered in the executed process or a choice selected therein. Room ID denotes an ID of a room where a chat is performed. By the room ID, a series of conversations with the chatbot may be identified. User ID is an identifier that identifies a user.

The user ID may be, for example, a media access control (MAC) address of the user terminal 201. The user ID may be generated from cookie information. Address is an Internet protocol (IP) address of the user terminal 201.

Although not depicted, the chatlog may include information such as script name, stay_time, and timezone.

Figure 8:
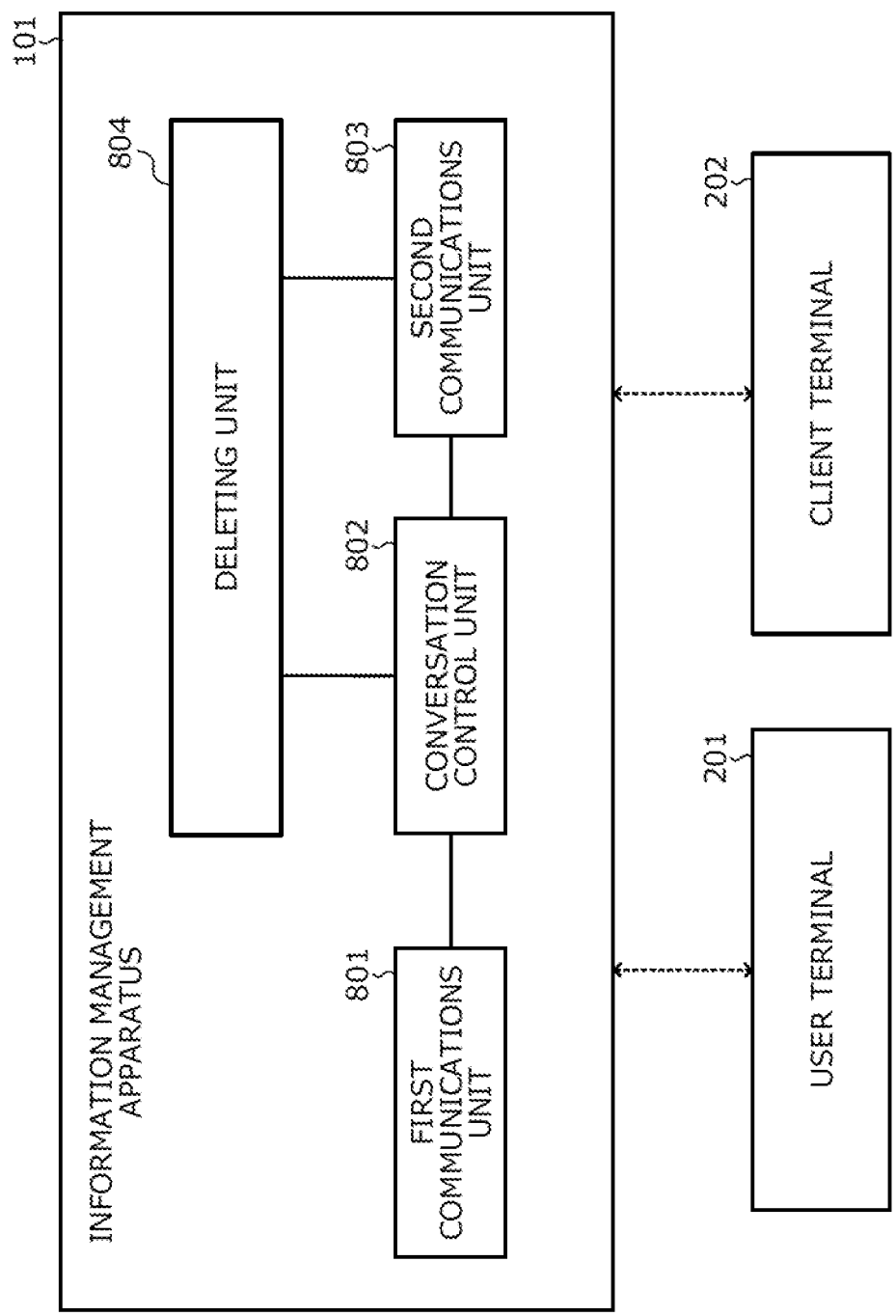
FIG. 8 is a block diagram depicting a functional configuration example of the information management apparatus 101.

FIG. 8 is a block diagram depicting a functional configuration example of the information management apparatus 101. In FIG. 8, the information management apparatus 101 includes a first communications unit 801, a conversation control unit 802, a second communications unit 803, and a deleting unit 804. For example, respective functions of the first communications unit 801 to the deleting unit 804 are implemented by programs stored in a storage device such as the memory 302, the disk 304, and the portable recording medium 307 depicted in FIG. 3 being executed by the CPU 301, or by a communication I/F 305. Processing results of the function units are stored to, for example, a storage device such as the memory 302 and the disk 304.

The first communications unit 801 receives, from the user terminal 201, a chat start instruction and user information corresponding to the user terminal 201. The chat start instruction is for starting a conversation between a user and a chatbot. The user information includes, for example, attribute information and personal information of the user using the user terminal 201. The personal information of the user is information that identifies the user and is a user ID, for example.

The user attribute information is information obtained by the user terminal 201 and represents characteristics and a situation of the user, and is information, for example, representative of age, gender, nationality, language, location, etc. The user terminal 201 may obtain the user attribute information, for example, by an input operation by the user using the input device 404 (see FIG. 4).

The user terminal 201 may obtain the user attribute information, for example, by analyzing image data (e.g., video) obtained by the camera 406 (see FIG. 4) to thereby extract information representative of the age(s), the gender(s), the number, etc. of the user(s). The user terminal 201 may obtain the user attribute information, for example, by analyzing voice data received by a microphone 408 (see FIG. 4) to thereby extract information representative of the gender(s), the language(s) (nationality(ies)) of the user(s). As the user attribute information, the user terminal 201 may obtain location information indicative of a current location by a non-depicted GPS unit, for example.

Thus, the user terminal 201 may obtain the attribute information related the ages, the genders, the nationalities, the languages, the number, the locations, etc. of the users.

An existing technique may be used as a technique of extracting the user attribute information from the image data or the voice data. For example, using an approach based on machine learning such as deep learning, the user terminal 201 may extract the attribute information related to age, gender, language, the number, etc. from an image or voice feature amount.

Figure 9:
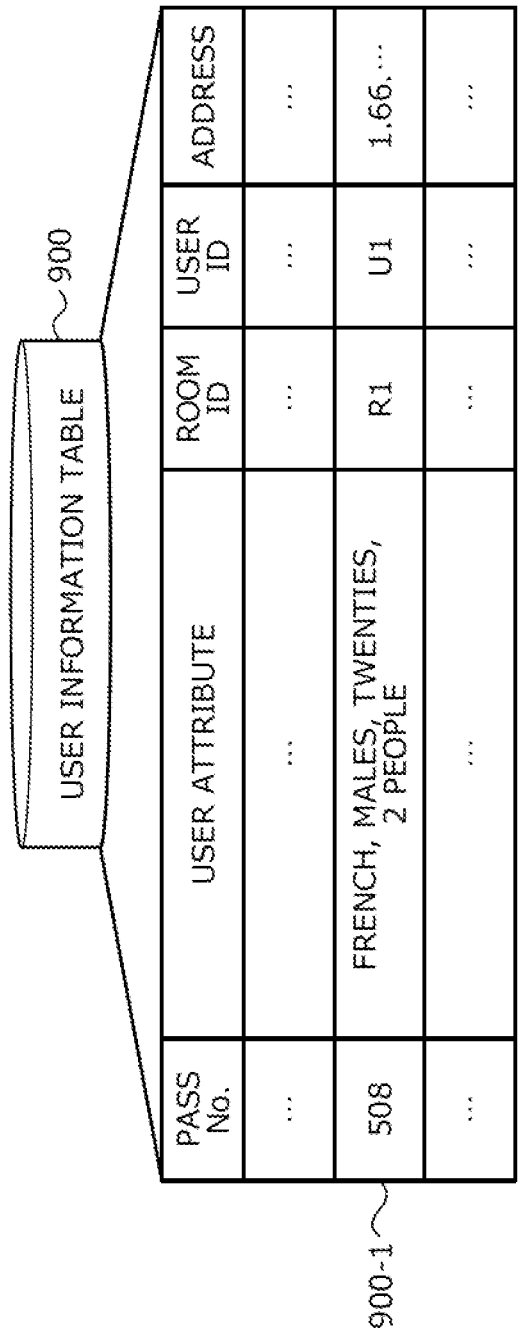
FIG. 9 is an explanatory view depicting an example of storage content of a user information table 900.

The received user information is stored to a user information table 900 such as that depicted in FIG. 9, for example. The user information table 900 is stored to the chatlog DB 230, for example.

FIG. 9 is an explanatory view depicting an example of the storage content of the user information table 900. In FIG. 9, the user information table 900 has fields including Pass No., User Attribute, Room ID, User ID, and Address and by setting information into the fields, the user information table 900 stores user management information (e.g., user management information 900-1) as a record.

Pass No. is an identifier that identifies user information. User Attribute is a user attribute identified from the user attribute information. Room ID denotes an ID of a room where a chat is performed. The room ID is set after the start of a conversation with a chatbot. User ID is an identifier identifying a user and is included in the user personal information. Address is an IP address of the user terminal 201 and is included in the user personal information.

The conversation control unit 802 starts a chatbot conversation on the user terminal 201, in response to the chat start instruction. For example, the conversation control unit 802 identifies a user attribute, based on the user attribute information included in the received user information. The conversation control unit 802 then refers to the script table 220 depicted in FIG. 5, to determine a script corresponding to the identified user attribute as a script to be applied to the chatbot conversation on the user terminal 201.

In the following description, the script to be applied to the chatbot conversation on the user terminal 201 may be referred to as "talk script".

The user attribute information is assumed to be "ages 'twenties' and genders 'female'". In this case, the conversation control unit 802 identifies a user attribute 'twenties× female', based on the user attribute information. The conversation control unit 802 then refers to the script table 220 to determine as the talk script a script corresponding to the identified user attribute 'twenties×female'.

The user attribute information is assumed to be "ages 'twenties', genders 'females', and the number of people '2 people'". In this case, the conversation control unit 802 identifies a user attribute 'twenties×females×2 people', based on the user attribute information. The conversation control unit 802 then refers to the script table 220 to determine as the talk script a script corresponding to the identified user attribute 'twenties×females×2 people'.

The user attribute information is assumed to be "age 'thirties', gender male, and location 'Akihabara'". In this case, the conversation control unit 802 identifies a user attribute 'thirties×male×Akihabara', based on the user attribute information. The conversation control unit 802 then refers to the script table 220 to determine as the talk script a script corresponding to the identified user attribute 'thirties×male×Akihabara'.

The user attribute information is assumed to be "ages 'twenties', genders male, language 'French', and the number of people '2 people'". In this case, the conversation control unit 802 identifies a user attribute 'twenties×males× French×2 people', based on the user attribute information. The conversation control unit 802 then refers to the script table 220 to determine as the talk script a script corresponding to the identified user attribute 'twenties×males× French×2 people'.

There may be a case where no script corresponding to the identified user attribute is present on the script table 220. In this case, the conversation control unit 802 may refer to the script table 220 to determine, as the talk script, a script corresponding to a user attribute 'all'. The conversation control unit 802 may refer to the script table 220 to determine, as the talk script, a script corresponding to at least an element of the user attribute.

For example, it is assumed that there is no script corresponding to a user attribute 'twenties×females×3 people'. In this case, the conversation control unit 802 may refer to the script table 220 to determine, as the talk script, a script corresponding to any user attribute of 'twenties×females'', 'twenties×3 people', and 'females×3 people'.

The conversation control unit 802 then uses the determined talk script to start a chatbot conversation on the user terminal 201. For example, according to the talk script, using the chatbot, the conversation control unit 802 speaks, displays choices, or searches and displays a FAQ corresponding to the selected choice.

By selecting a choice or inputting a message into the user terminal 201, the user has a conversation with the chatbot. The chatlog indicative of the conversation history between the chatbot and the user is stored in the chatlog DB 230, for example.

After the chatbot conversation starts, the conversation control unit 802 sends recommend information related to services to the user terminal 201, based on the content of the conversation. The recommend information is, for example, a list of recommended services. The recommended services are previously defined as choices in the talk script, for example.

For example, in a case in which a choice requiring display of a service list is selected after the start of the chatbot conversation, the conversation control unit 802 sends recommend information related to services to the user terminal 201. As a result, the service list of the recommended services is displayed on the user terminal 201.

A screen example including the service list displayed on the user terminal 201 is described later using FIG. 12A.

After sending recommend information related to services to the user terminal 201, the conversation control unit 802 may confirm user consent on providing information to the service provider. The information to be provided is the user information received from the user terminal 201. Note, however, that the user personal information included in the user information may be excluded from the information to be provided. Processing to confirm consent may be described in the talk script, for example.

A screen example for confirming user consent displayed on the user terminal 201 is described later using FIG. 12B.

The conversation control unit 802 receives information related to a desire to use a service as a reply to the recommend information from the user terminal 201. The information related to a desire to use a service is information indicating that the user desires to use the service and, for example, includes a request to display a list of service providers.

In a case in which information indicating that the user does not desire to use the services is received as a reply to the recommend information from the user terminal 201, the conversation control unit 802 may change the content of the recommend information and send the recommend information to the user terminal 201. In a case in which information indicating that the user does not desire to use the services is received, the conversation control unit 802 may terminate the chatbot conversation.

In a case in which information is received indicating that the user does not consent to the provision of information to the service provider, the conversation control unit 802 may change the content of the recommend information and send the recommend information to the user terminal 201 or may terminate the chatbot conversation.

In a case in which information related to a desire to use a service is received as a reply to the recommend information from the user terminal 201, the second communications unit 803 sends pass information to the client terminal 202 that corresponds to the provider of the service. Here, a provider of the service is, for example, a store that provides a service and is pre-registered for each service. Only one store may be registered as the service provider or plural stores may be registered.

The pass information is information that enables access to the user information received from the user terminal 201. For example, the pass information is information indicating authority to access the user information a predetermined number of times or during a predetermined period. More specifically, the pass information is, for example, one-time pass information enabling access to the user information only one time within a validity period.

The pass information may be information that enables access to the user attribute information, of the user attribute information and the user personal information included in the user information. In other words, the pass information may be information that enables access to only the user attribute information, instead of enabling access to all the information included in the user information.

The pass information includes, for example, a pass No. that identifies accessible user information. For example, the client terminal 202 may access the user information only one time within the validity period, using the pass No. included in the pass information.

For example, when receiving, from the client terminal 202, an access request designating a pass No., the information management apparatus 101 refers to the user information table 900 depicted in FIG. 9 and identifies a user attribute corresponding to the designated pass No. The information management apparatus 101 then sends user attribute information that is representative of the identified user attribute to the client terminal 202. As a result, the user attribute information is displayed on the client terminal 202.

This enables the service provider to check the attribute information of the user desiring to use a service to thereby determine whether the service can be provided. It is to be noted, however, that in cases outside the validity period of the pass information and in cases of a second or subsequent access request, the information management apparatus 101 sends a response of being inaccessible to the user information to the client terminal 202.

A screen example including the user attribute information displayed on the client terminal 202 is described later using FIG. 13A.

The second communications unit 803 receives, from the client terminal 202, information indicating that the service can be provided to the user that corresponds to the user information accessed using the pass information. For example, the second communications unit 803 receives a service providable notification from the client terminal 202 to which the second communications unit 803 sent the pass information. The service providable notification is information indicating that the service is providable. The service providable notification includes, for example, the pass No. included in the pass information.

The second communications unit 803 receives, from the client terminal 202, information indicating that the service cannot be provided to the user that corresponds to the user information accessed using the pass information. In particular, for example, the second communications unit 803 receives a service not-providable notification from the client terminal 202 to which the second communications unit 803 sent the pass information. The service not-providable notification is information indicating that the service is not providable. The service not-providable notification includes, for example, the pass No. included in the pass information.

In case of receiving information indicating that the service is providable from the client terminal 202, the conversation control unit 802 may send provider information related to the provider capable of providing the service, to the user terminal 201. In this case, the provider capable of providing the service is a provider that corresponds to the client terminal 202 that sent information indicating that the service can be provided.

The provider information is, for example, information enabling selection of a store hoping to provide the service from among stores that can provide the service. The provider information includes the pass No. of the pass information. As a result, for example, based on the provider information, a list of stores capable of provision of the service is displayed on the user terminal 201, thereby enabling selection of a store hoping to provide the service, from the store list.

A screen example including the store list displayed on the user terminal 201 will be described later using FIG. 12C.

The conversation control unit 802 receives information that specifies a provider hoping to provide the service as a reply to the provider information from the user terminal 201. For example, the conversation control unit 802 receives, from the user terminal 201, a store selection result that specifies a store selected from the list of stores capable of providing the service. The store selection result includes, for example, a pass No. included in the provider information.

In a case in which a predetermined deletion condition is satisfied, the deleting unit 804 deletes the user information received from the user terminal 201. The predetermined deletion condition may be set arbitrarily. In deleting the user information, the deleting unit 804 may delete only the user personal information, of the user attribute information and personal information included in the user information. In other words, the user attribute information included in the user information may be excluded from being subject to deletion.

For example, in case of receiving, from the client terminal 202, information indicating that the service can be provided to a user corresponding to the user information accessed using the pass information, the deleting unit 804 may delete the user information received from the user terminal 201.

Describe in more detail, for example, in a case in which the service providable notification is received from the client terminal 202, the deleting unit 804 refers to the user information table 900 to identify user management information that corresponds to the pass No. included in the service providable notification. The deleting unit 804 then identifies a chatlog corresponding to the room ID of the identified user management information, from the chatlog DB 230. The deleting unit 804 then deletes the user ID and the address from the identified chatlog.

As a result, for a user hoping to use a service, at the timing when a provider (store) capable of providing the service is found, personally identifiable information may be deleted from the chatlog within the chatlog DB 230.

The deleting unit 804 deletes the identified user management information from the user information table 900. At this time, the deleting unit 804 may delete only the user ID and the address of the identified user management information.

This enables the personally identifiable information to be deleted from the user information table 900 at the timing when a provider (store) capable of providing a service is found for the user hoping to use the service. By leaving the user attribute included in the user management information, the user attribute may be useful when performing log analysis, etc. The user attribute corresponding to the chatlog may be identified from, for example, the room ID included in the user management information.

The deleting unit 804 may delete the user information received from the user terminal 201, in a case in which, for example, Information identifying a provider hoping to provide a service as a reply to the provider information is received from the user terminal 201.

Described in more detail, for example, in a case in which a store selection result is received from the user terminal 201, the deleting unit 804 refers to the user information table 900 to identify user management information that corresponds to the pass No. included in the store selection result. The deleting unit 804 then identifies a chatlog that corresponds to the room ID of the identified user management information, from the chatlog DB 230. The deleting unit 804 then deletes the user ID and the address from the identified chatlog.

As a result, at the timing when a store (provider) hoping to provide the service is selected by the user, personally identifiable information may be deleted from the chatlog in the chatlog DB 230.

The deleting unit 804 deletes the identified user management information from the user information table 900. At this time, the deleting unit 804 may delete only the user ID and the address of the identified user management information.

As a result, at the timing when a store (provider) hoping to provide the service is selected by the user, personally identifiable information may be deleted from the user information table 900.

The deleting unit 804 may delete the user information received from the user terminal 201, for example, in a case in which a predetermined time has elapsed since the sending of the pass information to the client terminal 202. The predetermined time is set to, for example, a period of several tens of seconds.

Described in more detail, for example, the deleting unit 804 refers to the user information table 900 to identify user management information that corresponds to the pass No. of the pass information for which a predetermined period has elapsed since being sending to the client terminal 202. The deleting unit 804 then identifies a chatlog corresponding to the room ID of the identified user management information, from the chatlog DB 230. The deleting unit 804 then deletes the user ID and the address from the identified chatlog.

As a result, at the timing when a predetermined time elapses since the sending of the pass information to the client terminal 202, personally identifiable information may be deleted from the chatlog in the chatlog DB 230.

The deleting unit 804 deletes the identified user management information from the user information table 900. At this time, the deleting unit 804 may delete only the user ID and the address of the identified user management information.

Thus, at the timing when a predetermined time elapses since the sending of the pass information to the client terminal 202, the personally identifiable information may be deleted from the user information table 900.

Communication between the information management apparatus 101 and the user terminal 201 may be disconnected before the predetermined deletion conditions are satisfied. For example, in a case in which the user forcibly terminates the conversation with the chatbot or a case in which a communication failure occurs, communication with the user terminal 201 is disconnected.

In such cases, the user information received from the user terminal 201 remains without being deleted from the information management apparatus 101. For this reason, the deleting unit 804 may delete the user information received from the user terminal 201, in cases in which communication with the user terminal 201 is terminated. This may prevent the user information from remaining in the information management apparatus 101 when the user leaves the chat partway through.

A deletion example of the user information will be described later using FIGS. 10 and 11.

The conversation control unit 802 may send matching establishment information related to a service to the user terminal 201 and the client terminal 202 (or only the user terminal 201), when information indicating that the service can be provided to the user that corresponds to the user information accessed using the pass information is received from the client terminal 202.

The conversation control unit 802 may send the matching establishment information to the user terminal 201 and the client terminal 202, in a case in which information identifying a provider hoping to provide the service is received as a reply to the provider information from the user terminal 201.

For example, in case in which the predetermined deletion conditions are satisfied, the conversation control unit 802 sends the matching establishment information to the user terminal 201 and the client terminal 202. The matching establishment information is information that indicates establishment of matching between a user using a service and a provider of the service.

The matching establishment information sent to the user terminal 201 includes information, for example, a uniform resource locator (URL), related to a store capable of providing the service. The matching establishment information sent to the client terminal 202 includes, for example, a message indicating the establishment of matching with a user that corresponds to the pass No.

As a result, the user may thereafter have direct access to the client terminal 202 from the user terminal 201 to make a store reservation, etc. The service provider may grasp that a reservation from the user that corresponds to the pass No. may occur.

Next, a deletion example in the information management apparatus 101 of user information received from the user terminal 201 is described with reference to FIGS. 10 and 11. A case in which user information corresponding to Pass No. '508' is deleted is described as an example. A case is also described in which only the user personal information is deleted, of the user attribute information and personal information included in the user information.

Figure 10:
FIG. 10 is an explanatory view depicting a user information deletion example.

FIG. 10 is an explanatory view depicting the user information deletion example. FIG. 10 depicts a chatlog 700-3 in the chatlog DB 230 (see FIG. 7). The chatlog 700-3 is an example of the chatlog that includes the user information that corresponds to Pass No. '508'.

In this case, the deleting unit 804 deletes a user ID 'U1' and an address '1.66 . . . ' from the chatlog 700-3. The user ID 'U1' and the address '1.66 . . . ' are equivalent to personal information of the user. As a result, personally identifiable information may be deleted from the chatlog 700-3.

FIG. 11 is an explanatory view depicting the user information deletion example. FIG. 11 depicts user management information 900-1 in the user information table 900 (see FIG. 9). The user management information 900-1 is user management information that includes user information corresponding to Pass No. '508'.

In this case, the deleting unit 804 deletes the user ID 'U1' and the address '1.66 . . . ' from the user management information 900-1. As a result, the personally identifiable information may be deleted from the user management information 900-1.

Using a room ID 'R1' of the user management information 900-1 as a key, a user attribute 'French, male, twenties, 2 people" that corresponds to a chatlog of the room ID 'R1' may be identified in the chatlog DB 230. This enables chat lead analysis, etc. to be performed after identifying the user attribute corresponding to the chatlog.

Next, with reference to FIGS. 12A1, 12A2, 12B1, 12B2, 12C1, 12C2, 12D1, and 12D2, screen examples of a conversation screen displayed on the display 403 (see FIG. 4) of the user terminal 201 are described. A case is assumed where, via the user terminal 201, a conversation with the chatbot starts using a talk script that corresponds to a user attribute 'twenties×male×French×2 people'.

FIGS. 12A1, 12A2, 12B1, 12B2, 12C1, 12C2, 12D1, and 12D2 are explanatory views depicting screen examples of a conversation screen of the user terminal 201. In FIG. 12A1, a conversation screen 1210 is an example of an operation screen that includes a service list 1211 displayed based on the recommend information from the information management apparatus 101 and related to services.

On the conversation screen 1210, a service desired to be used may be selected by a selection of any one of buttons 1212 to 1216 in the service list 1211 through, for example, an input operation by the user using the input device 404 (see FIG. 4).

When a button 1217 in the service list 1211 is selected through a user input operation on the conversation screen 1210, information indicating no desire to use any service is sent from the user terminal 201 to the information management apparatus 101.

For example, when the button 1215 is selected on the conversation screen 1210, a conversation screen 1220 depicted in FIG. 12A2 appears. The conversation screen 1220 is a confirmation screen inquiring whether to display a list of stores capable of providing a service 'Maid Cafe' and service details.

When a button 1221 is selected through a user input operation on the conversation screen 1220, a conversation screen 1230 depicted in FIG. 12B1 appears. When a button 1222 is selected through a user input operation on the conversation screen 1220, the conversation screen 1210 appears again.

In FIG. 12B1, the conversation screen 1230 is an example of a consent confirmation screen confirming consent on whether user information (user information not including personal information) may be provided to service providers. On the conversation screen 1230, a message is displayed indicating that user information provided to service providers will be deleted at the time of termination of the conversation.

By the conversation screen 1230, the user may indicate consent on whether user information may be provided to service providers. The user is able to know that the user information will be deleted at the time of termination of the conversation with the chatbot.

When a button 1231 is selected through a user input operation on the conversation screen 1230, information indicating a desire to use the service is sent from the user terminal 201 to the information management apparatus 101, whereby a message 1233 depicted in FIG. 12B2 is displayed, after which a conversation screen 1240 depicted in FIG. 12C1 appears. When a button 1232 is selected through a user's operation input on the conversation screen 1230, the conversation screen 1210 returns.

In FIG. 12C1, the conversation screen 1240 is an example of the operation screen including a store list 1241 displayed based on the provider information related to providers capable of providing the service from the information management apparatus 101. The store list 1241 is a list of stores that responded as being able to provide the service to the user corresponding to a user attribute 'twenties×male× French×2 people'.

By a selection of either button 1242 or 1243 in the store list 1241 through a user input operation on the conversation screen 1240, a store hoping to provide the service may be selected. When a button 1244 in the store list 1241 is selected on the conversation screen 1240 through a user input operation, information indicative of not desiring to use the service is sent from the user terminal 201 to the information management apparatus 101.

For example, when the button 1242 is selected on the conversation screen 1240, a store selection result 'Store C' is sent from the user terminal 201 to the information management apparatus 101, whereby a conversation screen 1250 depicted in FIG. 12C2 appears. The conversation screen 1250 is an example of an operation screen displayed based on the matching establishment information sent from the information management apparatus 101 in response to the store selection result 'Store C' from the user terminal 201.

When a button 1251 is selected through a user input operation on the conversation screen 1250, information for making a reservation for Store C is sent from the user terminal 201 to the information management apparatus 101. As a result, the conversation with the chatbot via the user terminal 201 terminates, whereby a reservation screen 1260 depicted in FIG. 12D1 is displayed. When a button 1252 is selected through a user input operation on the conversation screen 1250, the screen is returned to the conversation screen 1240.

When the information for making a reservation for Store C is sent to the information management apparatus 101, user information received from the user terminal 201 is deleted in the information management apparatus 101. In other words, in a case of receiving the store selection result 'Store C' and receiving the information for making a reservation for Store C, the information management apparatus 101 assumes that information specifying a provider hoping to provide the service has been received and consequently deletes the user information.

The reservation screen 1260 is an example of the operation screen displayed based on the matching establishment information (e.g., URL of Store C) from the information management apparatus 101. When a button 1261 is selected after the number of people, mail address, contact phone number, and arrival time are specified through a user input operation on the reservation screen 1260, the reservation for Store C may be registered.

Described in more detail, when the button 1261 is selected, reservation registration information including the specified number of people, mail address, contact phone number, and arrival time is sent from the user terminal 201 to the client terminal 202 that corresponds to Store C. The reservation registration information may include user attribute information or pass No. that corresponds to the user attribute information. As a result, when the reservation for store C is completed, a reservation completion screen 1270 depicted in FIG. 12D2 appears.

When a button 1262 is selected through a user input operation on the reservation screen 1260, the reservation registration for store C is cancelled, whereby display of the reservation screen 1260 is terminated.

Next, screen examples of various screens displayed on the display 403 (see FIG. 4) of the client terminal 202 are described. First, with reference to FIGS. 13A1, 13A2, and 13B, a screen example of a user attribute screen is described.

Figure 13B:
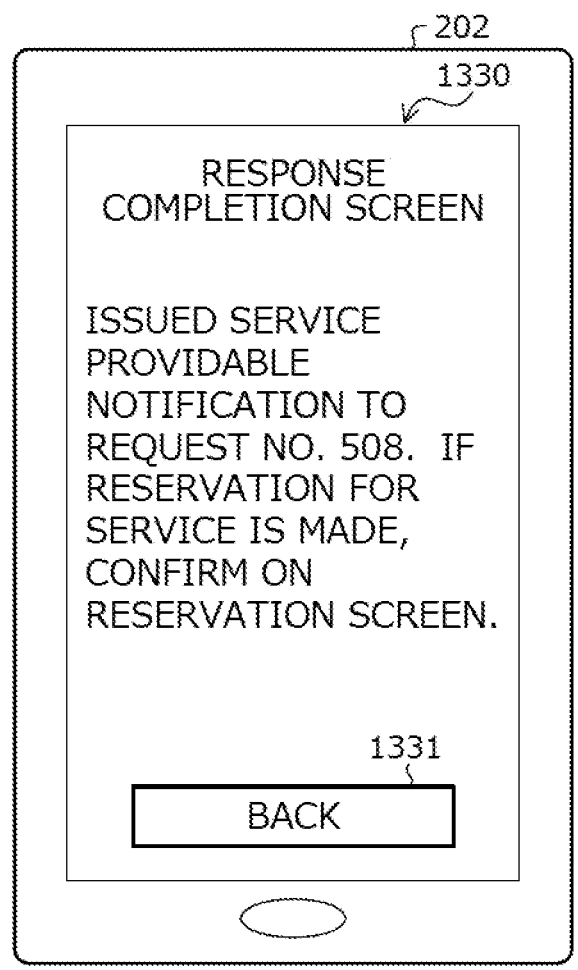
FIG. 13B is an explanatory view depicting a screen example of a user attribute screen of the client terminal 202.

FIGS. 13A1, 13A2, and 13B are explanatory views depicting the screen example of the user attribute screen of the client terminal 202. In FIG. 13A1, a user attribute screen 1310 is an example of an operation screen including a service request list 1311 displayed based on pass information from the information management apparatus 101. The service request list 1311 is a list of requests indicating a desire to use services of the provider that corresponds to the client terminal 202. Note that the example depicted in FIG. 13A1 depicts only one service request.

By a selection of a button 1312 on the user attribute screen 1310 through an input operation by the user using the input device 404 (see FIG. 4), user information corresponding to Pass No. '508' may be accessed. The user of the client terminal 202 is a service provider.

Described in more detail, when the button 1312 is selected, an access request designating Pass No. '508' is sent from the client terminal 202 to the information management apparatus 101, whereby a user attribute screen 1320 depicted in FIG. 13A2 appears. Note that, when a button 1313 is selected through a user input operation on the user attribute screen 1310, display of the user attribute screen 1310 is terminated to allow return to an initial screen (not depicted).

The user attribute screen 1320 is an example of an operation screen displaying user attribute information 1321 corresponding to Pass No. '508'. The user attribute information 1321 indicates a user attribute 'twenties×male× French×2 people' of the user corresponding to Pass No. '508'. By the user attribute screen 1320, the service provider may check attributes of the user desiring to use a service, to determine whether the service can be provided.

When a button 1322 is selected on the user attribute screen 1320, a service providable notification is sent from the client terminal 202 to the information management apparatus 101. The service providable notification is information indicating that the service can be provided to the user corresponding to the pass information (Pass No. '508').

When a button 1323 is selected on the user attribute screen 1320, a service not-providable notification is sent from the client terminal 202 to the information management apparatus 101. The service not-providable notification is information indicating that the service cannot be provided to the user corresponding to the pass information (Pass No. '508').

Here, a case is assumed in which the button 1322 is selected on the user attribute screen 1320. In this case, a user attribute screen 1330 depicted in FIG. 13B appears. The user attribute screen 1330 is a response completion screen indicating that a response to the service request corresponding to Pass No. '508' is completed.

Note that, when a button 1331 is selected through a user input operation on the user attribute screen 1330, display of the user attribute screen 1330 is terminated to allow return to the initial screen (not depicted).

Next, with reference to FIGS. 14A1, 14A2, and 14B, a screen example of a reservation confirmation screen is described.

Figure 14B:
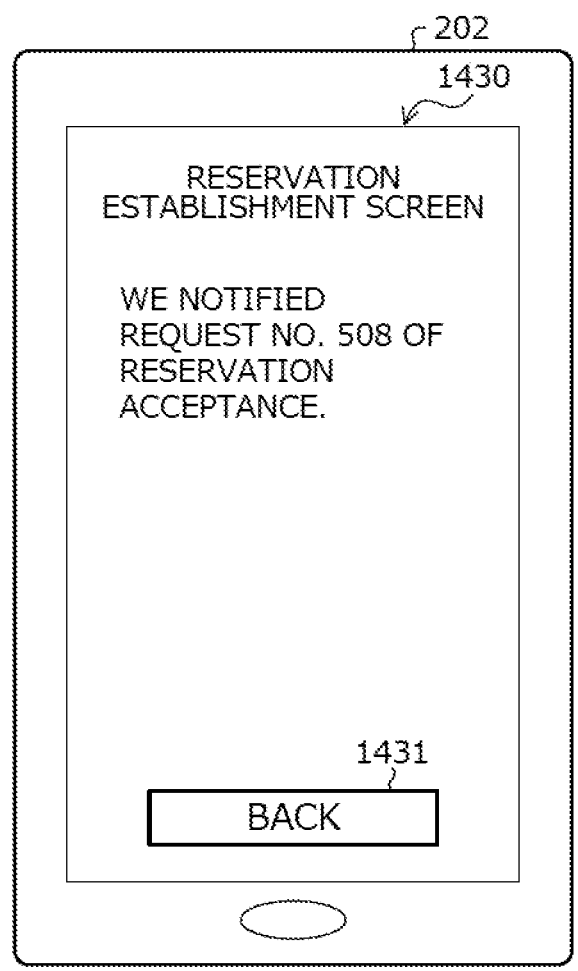
FIG. 14B is an explanatory view depicting a screen example of a reservation confirmation screen of the client terminal 202.

FIGS. 14A1, 14A2, and 14B are explanatory views depicting the screen example of the reservation confirmation screen of the client terminal 202. In FIG. 14A1, a reservation confirmation screen 1410 is an example of an operation screen that includes a reservation request list 1411 displayed based on reservation registration information from the user terminal 201. The reservation request list 1411 is a list of requests indicating a desire to reserve services. Note that the example depicted in FIG. 14A1 depicts only one reservation request.

When a button 1412 is selected through a user input operation on the reservation confirmation screen 1410, a reservation confirmation screen 1420 depicted in FIG. 14A2 appears to allow display of reservation information details corresponding to Pass No. '508'. When a button 1413 is selected through a user input operation on the reservation confirmation screen 1410, display of the reservation confirmation screen 1410 is terminated enabling return to the initial screen (not depicted).

Here, a case is assumed in which the button 1412 is selected on the user attribute screen 1410. In this case, the reservation confirmation screen 1420 is displayed. The reservation confirmation screen 1420 is an example of a reservation information details screen displayed based on reservation registration information from the user terminal 201. The reservation confirmation screen 1420 includes reservation information 1421 and user attribute information 1422.

The reservation information 1421 indicates the number of people, mail address, contact phone number, and arrival time specified by a user that requests a service. The user attribute information 1422 indicates a user attribute "twenties×male× French×2 people" of the user that requests the service.

By the reservation confirmation screen 1420, the provider of the service may check the content of reservation registration from the user and the user attribute to determine whether to accept the reservation. Since the provider of the service is able to accept the reservation after grasping the user attribute, it is possible to take detailed measures at the time of providing the service, leading to an improvement in service quality.

When a button 1423 is selected on the reservation confirmation screen 1420, a reservation acceptance notification is sent from the client terminal 202 to the user terminal 201. The reservation acceptance notification is information indicating that the reservation has been accepted. When a button 1424 is selected on the reservation confirmation screen 1420, a reservation decline notification is sent from the client terminal 202 to the user terminal 201. The reservation decline notification is information indicating that the reservation is not accepted.

Here, a case is assumed in which the button 1423 is selected on the reservation confirmation screen 1420. In this case, a reservation confirmation screen 1430 depicted in FIG. 14B appears. The reservation confirmation screen 1430 is a reservation establishment screen (response completion screen) indicating that the reservation for the reservation request corresponding to Pass No. '508' is established.

When a button 1431 is selected through a user input operation on the reservation confirmation screen 1430, display of the reservation confirmation screen 1430 is terminated to allow return to the initial screen (not depicted).

An information management processing procedure of the information management apparatus 101 is described.

Figure 16:
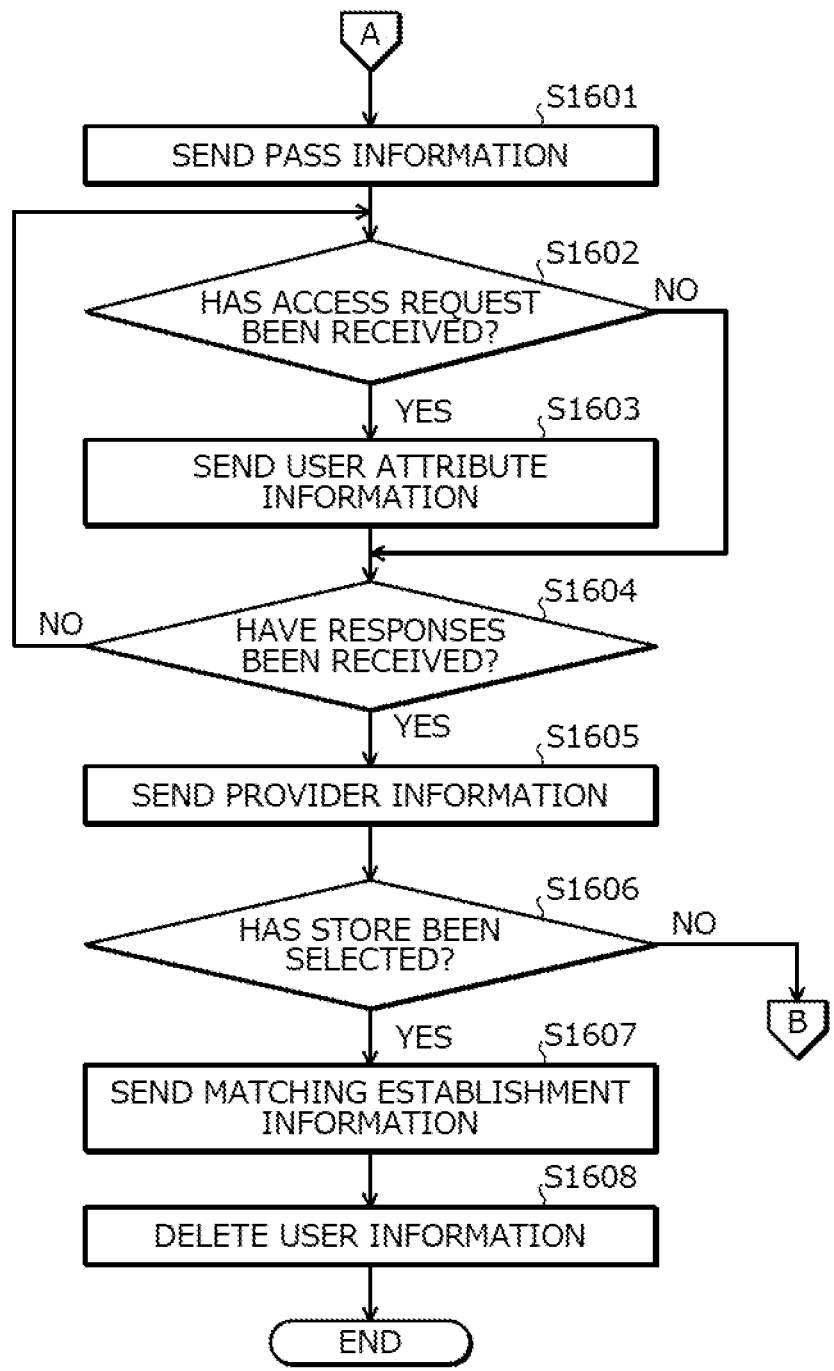
FIG. 16 is a flowchart depicting an example of the information management processing procedure of the information management apparatus 101.

FIGS. 15 and 16 are flowcharts depicting an example of the information management processing procedure of the information management apparatus 101. In the flowchart depicted in FIG. 15, the information management apparatus 101 first determines whether the information management apparatus 101 has received, from the user terminal 201, user information corresponding to the user terminal 201 together with a chat start instruction (step S1501).

The information management apparatus 101 waits to receive user information together with a chat start instruction (step S1501: NO). Upon receiving user information together with a chat start instruction (step 1501: YES), the information management apparatus 101 identifies a user attribute, based on the received user information (step S1502).

The information management apparatus 101 then refers to the script table 220 and determines, as a talk script to be applied to a chatbot conversation on the user terminal 201, a script that corresponds to the identified user attribute (step S1503). Using the determined talk script, the information management apparatus 101 starts a conversation via the chatbot and the user terminal 201 (step S1504).

The information management apparatus 101 then sends recommend information related to services to the user terminal 201, based on the content of the conversation (step S1505). As a result, on the user terminal 201, the conversation screen 1210 is displayed including the service list 1211 such as that depicted in FIG. 12A1, for example.

The information management apparatus 101 then determines whether a service desired to be used has been selected at the user terminal 201 (step S1506). When a service desired to be used has not been selected (step S1506: NO), the information management apparatus 101 returns to step S1505.

On the other hand, when a service desired to be used has been selected (step S1506: YES), the information management apparatus 101 determines whether display of the store list and the service details is desired at the user terminal 201 (step S1507). When display of the store list and service details is not desired (step S1507: NO), the information management apparatus 101 returns to step S1505.

On the other hand, when display of the store list and the service details is desired (step S1507: YES), the information management apparatus 101 determines whether the user consents to provide the user information to stores (step S1508). When the user does not consent to provide the user information to stores (step S1508: NO), the information management apparatus 101 returns to step S1505.

On the other hand, when the user consents to provide the user information to the stores (step S1508: YES), the information management apparatus 101 transitions to step S1601 depicted in FIG. 16.

In the flowchart depicted in FIG. 16, first, the information management apparatus 101 sends, to the client terminal 202 that corresponds to the provider of the service, pass information that enables access to the user information received from the user terminal 201 (step S1601). The information management apparatus 101 then determines whether the information management apparatus 101 has received, from the client terminal 202, an access request designating a pass No. (step S1602).

When an access request has not been received from the client terminal 202 (step S1602: NO), the information management apparatus 101 transitions to step S1604. On the other hand, when an access request has been received from the client terminal 202 (step S1602: YES), the information management apparatus 101 sends user attribute information corresponding to the designated pass No. to the client terminal 202 (step S1603).

The information management apparatus 101 then determines whether the information management apparatus 101 has received, from all of client terminals 202 to which the information management apparatus 101 sent the pass information, a response (service providable notification or service not-providable notification) indicating whether the service can be provided to the user corresponding to the user information accessed using the pass information (step S1604).

When the information management apparatus 101 has not received a response from all of the client terminals 202 (step S1604: NO), the information management apparatus 101 returns to step S1602. The information management apparatus 101 may transition to step S1605 when a predetermined time (e.g., 20 sec.) elapses from the sending of the pass information at step S1604.

When the information management apparatus 101 has received a response from all of the client terminals 202 to which the information management apparatus 101 sent the pass information (step S1604: YES), the information management apparatus 101 sends, to the user terminal 201, provider information related to providers that can provide the service, based on the received responses (service providable notification or service not-providable notification) (step S1605). As a result, the conversation screen 1240 including the store list 1241 such as that depicted in FIG. 12C1, for example appears on the user terminal 201.

The information management apparatus 101 then determines whether a store hoping to provide the service has been selected at the user terminal 201 (step S1606). When a store hoping to provide the service has not been selected (step S1606: NO), the information management apparatus 101 returns to step S1505.

On the other hand, when a store hoping to provide the service has been selected (step S1606: YES), the information management apparatus 101 sends matching establishment information to the user terminal 201 and the client terminal 202 that corresponds to the selected store (step S1607).

The information management apparatus 101 then deletes the user information received from the user terminal 201, from the chatlog DB 230 and the user information table 900 (step S1608) and thereby terminates a series of processes of the flowchart. At this time, the information management apparatus 101 may delete only the user personal information, of the user attribute information and personal information included in the user information.

As a result, the service provider may determine whether the service is providable, after checking the attribute information of the user hoping to use the service. The user information may be deleted from the information management apparatus 101 at the timing when the user has selected a desired store to provide the service among the stores able to provide the service, whereby the user information may be prevented from being accumulated as a log.

Next, a reservation registration processing procedure of the user terminal 201 is described.

Figure 17:
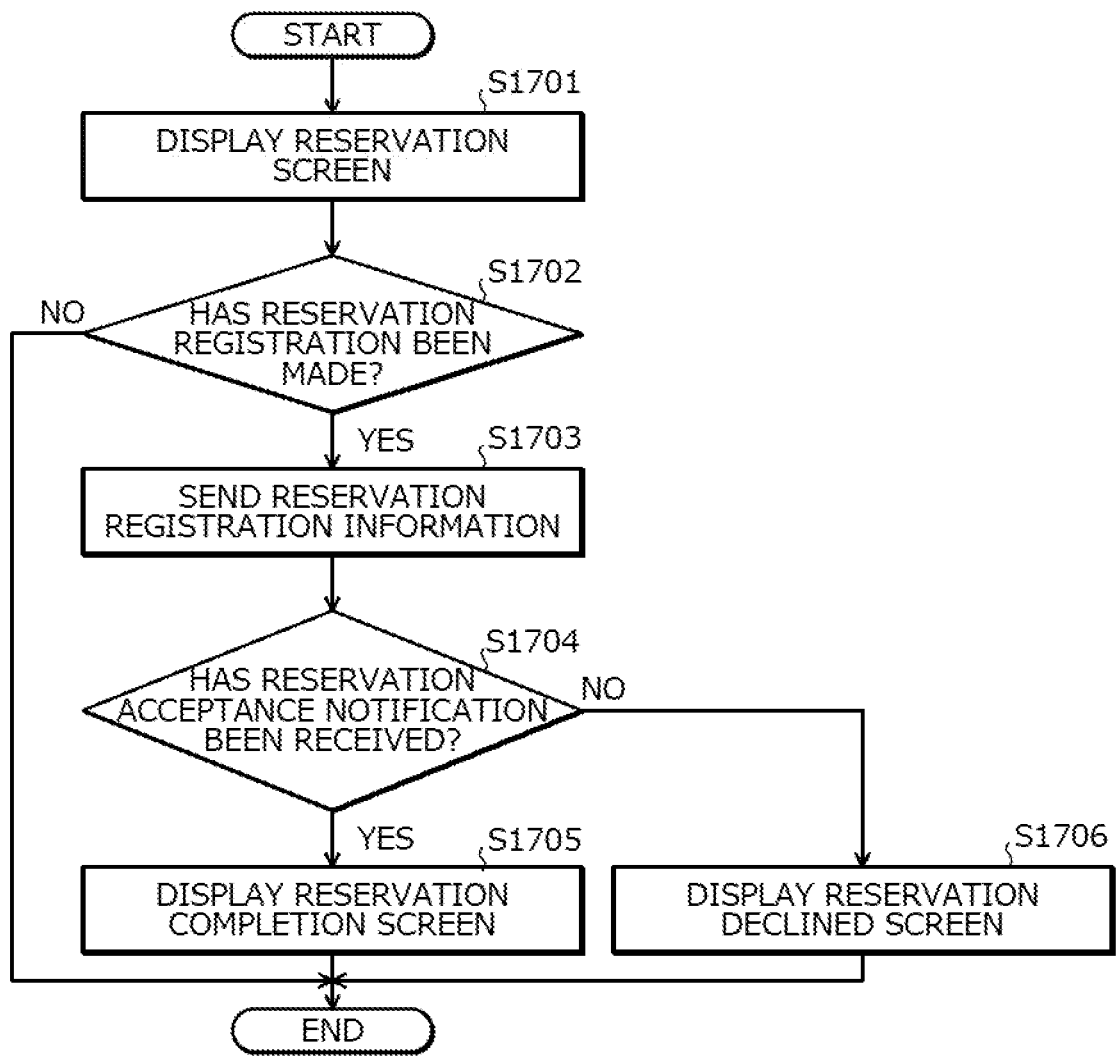
FIG. 17 is a flowchart depicting an example of a reservation registration processing procedure of the user terminal 201.

FIG. 17 is a flowchart depicting an example of the reservation registration processing procedure of the user terminal 201. In the flowchart depicted in FIG. 17, the user terminal 201 first displays a reservation screen, based on the matching establishment information from the information management apparatus 101 (step S1701). The reservation screen may be the reservation screen 1260 as depicted in FIG. 12D1, for example.

The user terminal 201 then determines whether a reservation registration for a store has been made on the reservation screen (step S1702). When the store reservation registration has not been made (step S1702: NO), the user terminal 201 terminates a series of processes of the flowchart.

On the other hand, when a reservation registration for a store has been made (step S1702: YES), the user terminal 201 sends reservation registration information to the client terminal 202 that corresponds to the store (step S1703). The user terminal 201 then determines whether the user terminal 201 has received a reservation acceptance notification from the client terminal 202 (step S1704).

When receiving a reservation acceptance notification from the client terminal 202 (step S1704: YES), the user terminal 201 displays a reservation completion screen (step S1705) and thereby terminates a series of processes of the flowchart.

On the other hand, when receiving a reservation decline notification from the client terminal 202 (step S1704: NO), the user terminal 201 displays a reservation declined screen (step S1706) and thereby terminates a series of processes of the flowchart.

This enables smooth execution of the store reservation registration using the matching establishment information from the information management apparatus 101.

A user information display processing procedure of the client terminal 202 is described.

Figure 18:
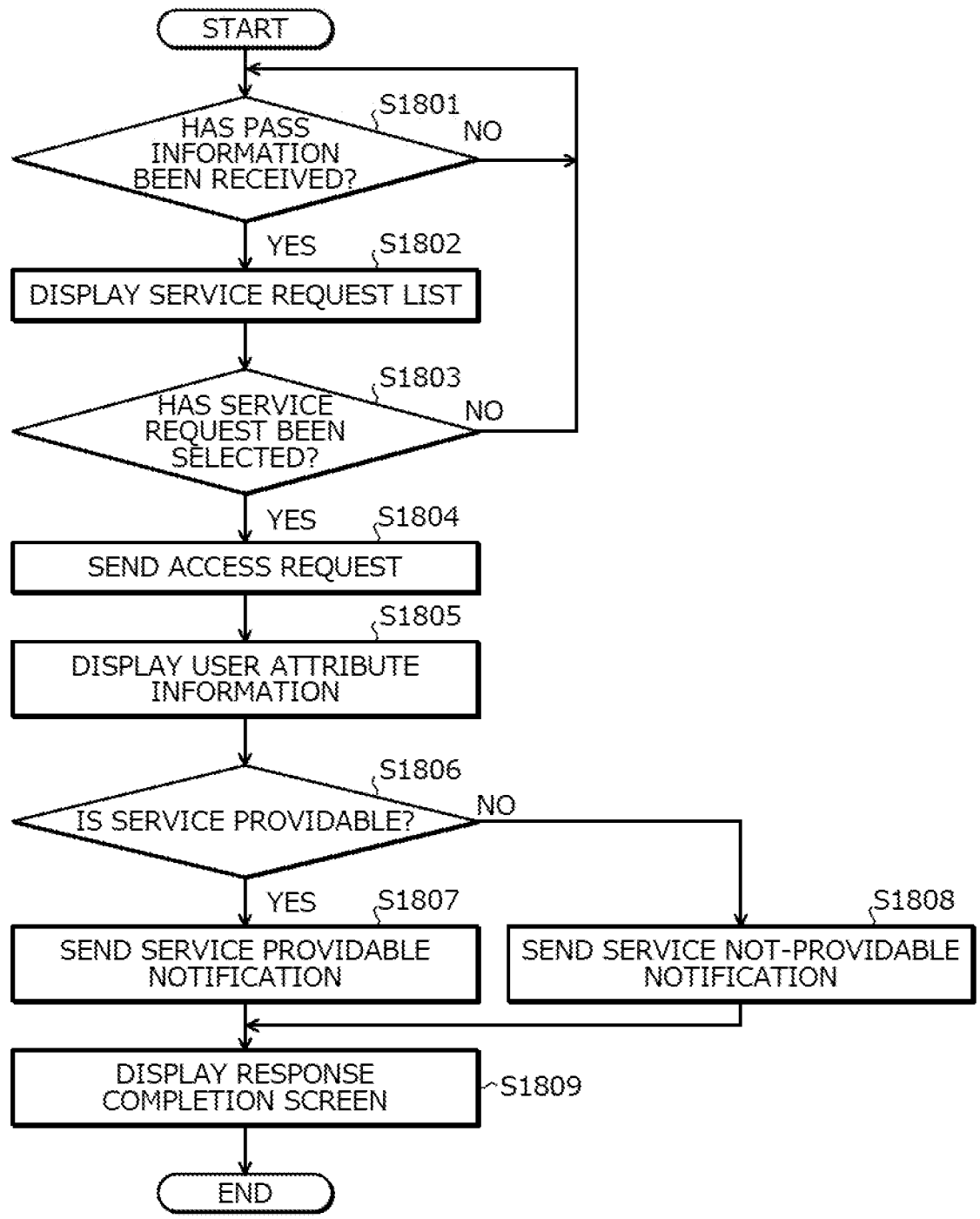
FIG. 18 is a flowchart depicting an example of a user information display processing procedure of the client terminal 202.

FIG. 18 is a flowchart depicting an example of the user information display processing procedure of the client terminal 202. In the flowchart depicted FIG. 18, the client terminal 202 first determines whether pass information has been received from the information management apparatus 101 (step S1801). The client terminal 202 waits to receive pass information (step S1801: NO).

When receiving pass information (step S1801: YES), the client terminal 202 displays a service request list, based on the received pass information (step S1802). The client terminal 202 then determines whether a service request has been selected from the service request list (step S1803).

When no service request has been selected (step S1803: NO), the client terminal 202 returns to step S1801. On the other hand, when a service request has been selected (step S1803: YES), the client terminal 202 sends an access request that designates a pass No. of the selected service request to the information management apparatus 101 (step S1804).

The client terminal 202 then displays user attribute information sent from the information management apparatus 101 in response to the sent access request (step S1805). The client terminal 202 then determines whether the service is providable, according to a user input operation (step S1806).

When the service is providable (step S1806: YES), the client terminal 202 sends a service providable notification to the information management apparatus 101 (step S1807) and transitions to step S1809.

On the other hand, when the service is not providable (step S1806: NO), the client terminal 202 sends a service not-providable notification to the information management apparatus 101 (step S1808). The client terminal 202 then displays a response completion screen indicating that a response to the service request is completed (step S1809) and thereby terminates a series of processes of the flowchart.

This enables the service provider to check the attribute of the user desiring to use the service and to thereby determine whether the service can be provided.

Next, a reservation processing procedure of the client terminal 202 is described.

Figure 19:
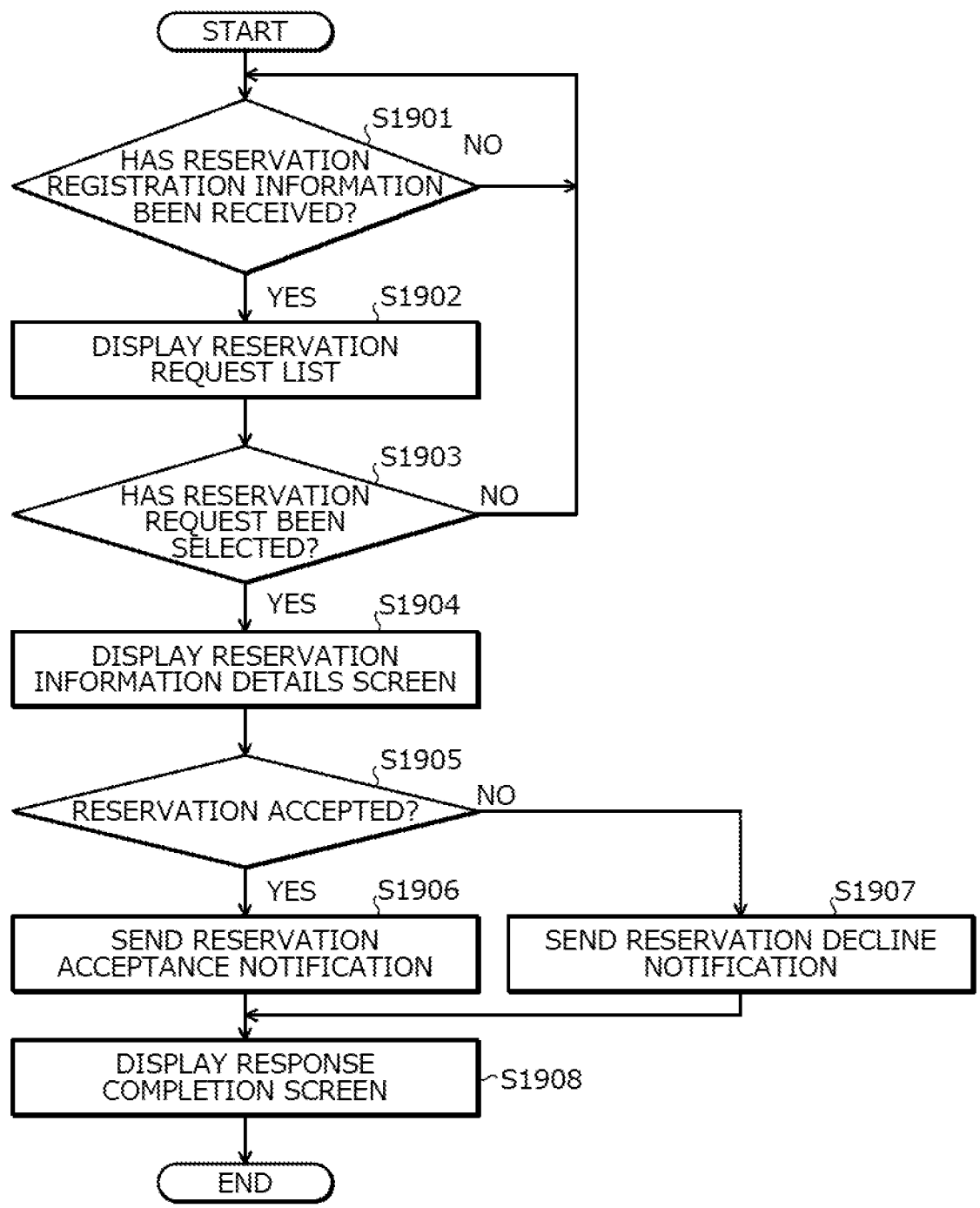
FIG. 19 is a flowchart depicting an example of a reservation processing procedure of the client terminal 202.

FIG. 19 is a flowchart depicting an example of the reservation processing procedure of the client terminal 202. In the flowchart depicted in FIG. 19, the client terminal 202 first determines whether the client terminal 202 has received reservation registration information from the user terminal 201 (step S1901). The client terminal 202 waits to receive reservation registration information from the user terminal 201 (step S1901: NO).

When receiving the reservation registration information from the user terminal 201 (step S1901: YES), the client terminal 202 displays a reservation request list, based on the received reservation registration information (step S1902). The client terminal 202 then determines whether a reservation request has been selected from the reservation request list (step S1903).

When a reservation request has not selected (step S1903: NO), the client terminal 202 returns to step S1901. On the other hand, when a reservation request has been selected (step S1903: YES), the client terminal 202 displays a reservation information details screen, based on the reservation registration information corresponding to the selected reservation request (step S1904). The reservation information details screen may be the reservation confirmation screen 1420 depicted in FIG. 14A, for example.

The client terminal 202 then determines whether the reservation is accepted, according to a user input operation (step S1905). When the reservation is accepted (step S1905: YES), the client terminal 202 sends a reservation acceptance notification to the user terminal 201 (step S1906) and transitions to step S1908.

On the other hand, when the reservation is declined (step S1905: NO), the client terminal 202 sends a reservation decline notification to the user terminal 210 (step S1907). The client terminal 202 then displays a response completion screen indicating that a response to the reservation request is completed (step S1908) and thereby terminates a series of processes of the flowchart.

This enables the service provider to check the content of reservation registration from the user and the user attribute to thereby determine whether to accept the reservation.

As described above, according to the information management apparatus 101 of the embodiment, by receiving a chat start instruction from the user terminal 201, receiving user information corresponding to the user terminal 201, and starting a chatbot conversation on the user terminal 201 in response to the chat start instruction, recommend information related to services may be sent to the user terminal 201, based on the content of the conversation. According to the information management apparatus 101, in a case in which information indicating a desire to use a service is received as a reply to the recommend information from the user terminal 201, pass information enabling access to the received user information may be sent to the client terminal 202 that corresponds to the service provider. The pass information is, for example, information that enables access to the user attribute information, of the user attribute information and personal information included in the user information.

The service provider thus may determine whether the service is providable, after checking the attribute information of the user desiring to use the service, leading to provision of services tailored to individual users. For example, if it is known that the user is a foreigner, providing higher quality services becomes possible by preparations such as having multilingual staff available or meeting the foreigner in a manner preferred by foreigners.

According to the information management apparatus 101, the user information may be deleted at least in a case of receiving information indicating that the service can be provided to the user corresponding to the user information accessed from the client terminal 202 using the pass information or a case where a predetermined time elapses.

The user information is thus deleted from the information management apparatus 101 at the timing when a provider is found that can provide a service to a user desiring to use the service or at the timing when a predetermined time elapses, whereby the user information may be prevented from being accumulated as a log. This reduces user resistance to personal information being taken, thereby achieving smooth provision of a service utilizing the chatbot.

According to the information management apparatus 101, when information indicating that a service is providable is received from the client terminal 202, provider information related to providers capable of providing the service may be sent to the user terminal 201. According to the information management apparatus 101, when information specifying a provider hoping to provide the service is received as a reply to the provider information from the user terminal 201, the user information may be deleted.

As a result, for example, from among stores capable of providing a service suited to the user, a store hoping to provide the service may be selected. Situations such as, for example, being unable to handle foreign languages thus may be prevented from occurring when the user actually accesses the store. The user information may be prevented from being accumulated as a log, by deleting the user information from the information management apparatus 101 at the timing when the user selects a store hoping to provide the service.

According to the information management apparatus 101, the user information may be deleted in a case in which the communication with the user terminal 201 terminates.

This may prevent the user information from being accumulated as a log in a case in which withdrawal from the chat occurs partway through due to, for example, forced termination of the conversation with the chatbot or due to an occurrence of a communications failure.

According to the information management apparatus 101, at the time of deleting user information, only the user personal information may be deleted of the user attribute information and personal information included in the user information.

As a result, information (e.g., information indicative of age, gender, etc.) other than information identifying individuals, of the user information, may be saved for log analysis.

According to the information management apparatus 101, in a case in which information indicating that the service is providable is received from the client terminal 202, matching establishment information related to the service may be sent to the user terminal 201 and the client terminal 202.

As a result, at the timing when a store capable of providing the service is found for a user desiring to use a service, the user and the store may be notified of the establishment of matching. The user may thereafter have a direct access to the store to make a store reservation, for example. The store may grasp that a reservation from a user corresponding to the pass information may occur.

According to the information management apparatus 101, in a case in which information specifying a provider hoping to provide the service is received from the user terminal 201, matching establishment information for the service may be sent to the user terminal 201 and the client terminal 202.

Thus, at a timing when a store hoping to provide the service is selected by the user, the user and the store may be notified of the establishment of matching.

According to the information management apparatus 101, using the talk script determined based on the user information, a chatbot conversation via the user terminal 201 may be started.

This enables flow of the chatbot conversation via the user terminal 201 to be dynamically changed depending on the characteristics (e.g., age, gender, etc.) of the user using the user terminal 201. For this reason, efforts of the user to obtain a desired reply may be reduced to prevent withdrawal from the chat, leading to increased use of the service.

According to the information management apparatus 101, pass information enabling access to the received user information a predetermined number of times (e.g., once) within a validity period may be sent to the client terminal 202 corresponding to the service provider.

Thus, matching between a user desiring to use a service and a store capable of providing the service may have a high real-time property.

The information management method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

The information management apparatus 101 described in the present embodiment may be realized by an application specific integrated circuit (ASIC) such as a standard cell or a structured ASIC, or a programmable logic device (PLD) such as a field-programmable gate array (FPGA).

According to one aspect of the present embodiments, an effect is achieved in that services utilizing a chatbot may be provided smoothly.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording having stored therein an information management program for causing a computer to execute a process comprising:
    receiving a chat start instruction from an information processing terminal and receiving therefrom user information that includes attribute information of a user and personal information of a user obtained by the information processing terminal;
    starting a conversation with a chatbot on the information processing terminal in response to the chat start instruction, and sending recommend information related to a service to the information processing terminal, based on contents of the conversation;
    sending pass information that enables access to the attribute information of the user included in the user information received, the pass information being sent to an information processing device that corresponds to a provider of the service, when information indicating a desire to use the service is received from the information processing terminal as a reply to the recommend information; and
    deleting the user information at least when a predetermined time elapses or when information indicating that the service is providable to the user that corresponds to the user information accessed using the pass information is received from the information processing device.

2. The recording medium according claim 1, the process further comprising
    sending provider information related to a provider that is able to provide the service, the provider information being sent to the information processing terminal when information indicating that the service is providable is received from the information processing device, wherein
    the deleting includes deleting the user information when information specifying the provider hoping to provide the service is received from the information processing terminal as a reply to the provider information.

3. The recording medium according to claim 1, wherein the deleting includes deleting the user information when communication with the information processing terminal terminates.

4. The recording medium according to claim 1, wherein the process of deleting includes deleting the personal information of the user, of the attribute information of the user and the personal information thereof included in the user information.

5. The recording medium according to claim 1, the process further comprising
sending matching establishment information for the service to the information processing terminal and the information processing device, when information indicating that the service is providable is received from the information processing device.

6. The recording medium according to claim 2, the process further comprising
sending matching establishment information for the service to the information processing terminal and the information processing device, when the information specifying the provider hoping to provide the service is received from the information processing terminal.

7. The recording medium according to claim 1, wherein the starting the conversation with the chatbot on the information processing terminal includes starting the conversation using a script determined based on the user information.

8. The recording medium according to claim 1, wherein the pass information is information that enables access to the attribute information a predetermined number of times within a validity period, the attribute information of the user being included in the user information.

9. The recording medium according to claim 1, the process further comprising
sending the attribute information of the user included in the user information, to the information processing device when an access request based on the pass information is received from the information processing device.

10. An information management method executed by a computer, the method comprising:
receiving a chat start instruction from an information processing terminal and receiving therefrom user information that includes attribute information of a user and personal information of a user obtained by the information processing terminal;
starting a conversation with a chatbot on the information processing terminal in response to the chat start instruction, and sending recommend information related to a service to the information processing terminal, based on contents of the conversation;
sending pass information that enables access to the attribute information of the user included in the user information received, the pass information being sent to an information processing device that corresponds to a provider of the service, when information indicating a desire to use the service is received from the information processing terminal as a reply to the recommend information; and
deleting the user information at least when a predetermined time elapses or when information indicating that the service is providable to the user that corresponds to the user information accessed using the pass information is received from the information processing device.

11. An information management apparatus comprising:
a memory; and
a processor coupled to the memory, the processor configured to:
receive a chat start instruction from an information processing terminal and receiving therefrom user information that includes attribute information of a user and personal information of a user obtained by the information processing terminal;
start a conversation with a chatbot on the information processing terminal in response to the chat start instruction, and sending recommend information related to a service to the information processing terminal, based on contents of the conversation;
send pass information that enables access to the attribute information of the user included in the user information received, the pass information being sent to an information processing device that corresponds to a provider of the service, when information indicating a desire to use the service is received from the information processing terminal as a reply to the recommend information; and
delete the user information at least when a predetermined time elapses or when information indicating that the service is providable to the user that corresponds to the user information accessed using the pass information is received from the information processing device.

* * * * *